(12) United States Patent
Narita et al.

(10) Patent No.: US 6,636,373 B1
(45) Date of Patent: Oct. 21, 2003

(54) TAPE RUNNING DRIVE DEVICE AND TAPE RECORDING AND OR REPRODUCING DEVICE

(75) Inventors: Hisaya Narita, Tokyo (JP); Takashi Tanigawa, Tokyo (JP); Mamoru Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/674,790
(22) PCT Filed: Mar. 3, 2000
(86) PCT No.: PCT/JP00/01295
§ 371 (c)(1), (2), (4) Date: Mar. 5, 2001
(87) PCT Pub. No.: WO00/54267
PCT Pub. Date: Sep. 14, 2000

(30) Foreign Application Priority Data

Mar. 5, 1999 (JP) .......................................... 11-059494

(51) Int. Cl.$^7$ .............................................. G11B 15/48
(52) U.S. Cl. .................................... 360/74.1; 360/73.04
(58) Field of Search ............................. 360/96.3, 96.4, 360/96.5, 74.1, 137; 242/201, 356.4

(56) References Cited

U.S. PATENT DOCUMENTS 4,799,116 A * 1/1989 Ida et al. .................... 360/74.1
5,717,540 A * 2/1998 Ishikawa et al. ........... 360/96.5

* cited by examiner

Primary Examiner—David Hudspeth
Assistant Examiner—K. Wong
(74) Attorney, Agent, or Firm—Jay H. Maioli

(57) ABSTRACT

A tape drive apparatus includes a pair of reel holder gears respectively provided in reel shafts which are respectively engaged with a pair of reels around which a tape is wound, a switching operation portion for switching at least a fast-forwarding operation and a rewinding operation, and a running mechanism for transporting the tape in the positive direction and in the reverse direction by selectively driving the pair of reel holder gears based on the direction in which the switching operation portion is moved. When the tape is transported in the positive direction, if the switching operation portion is moved in one direction, then the tape is transported at a high speed in the positive direction to fast-forward the tape. If the switching operation portion is moved in the other direction reverse to the one direction, then the tape is transported at a high speed in the reverse direction to thereby rewind the tape.

26 Claims, 28 Drawing Sheets

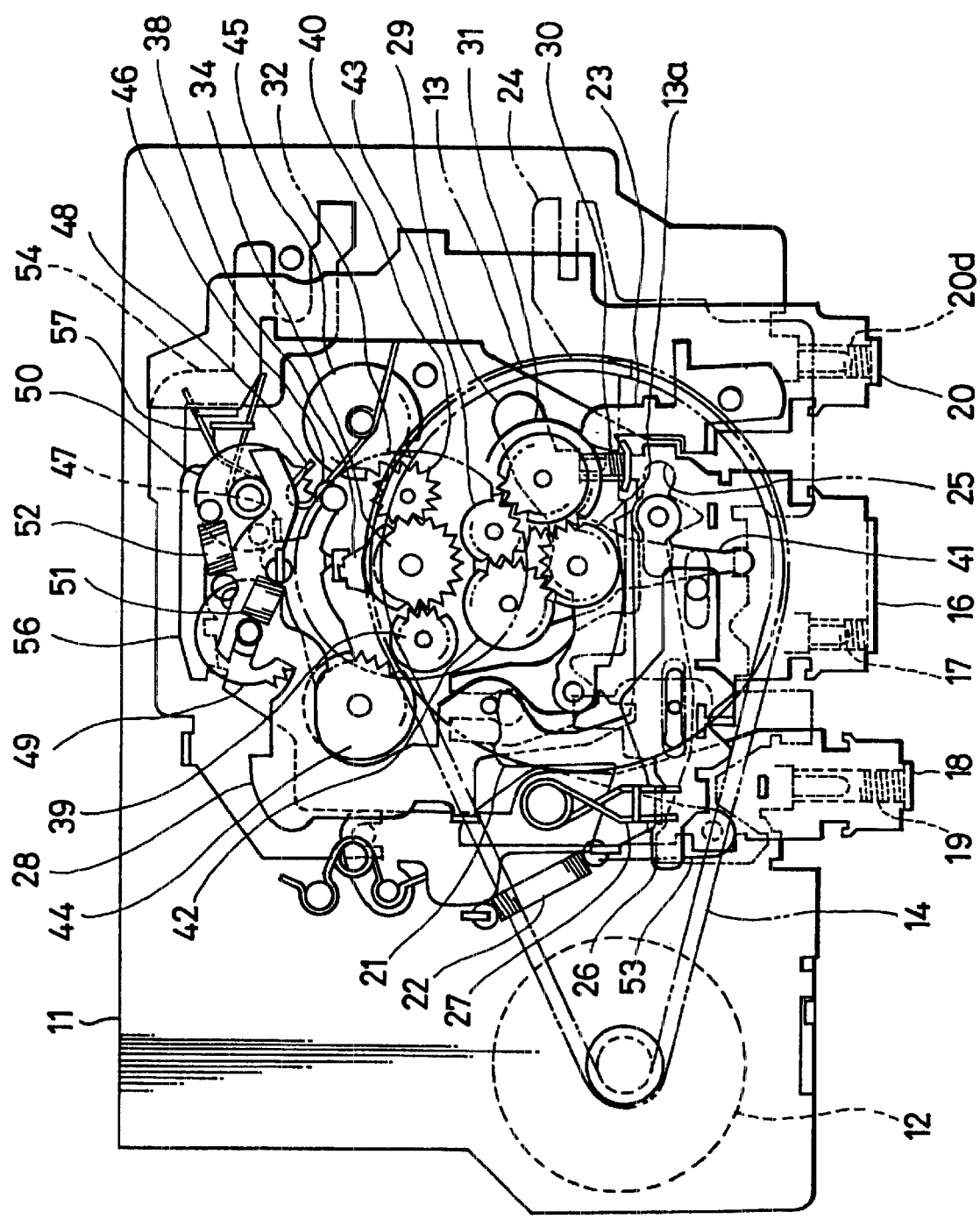
FIG. 20
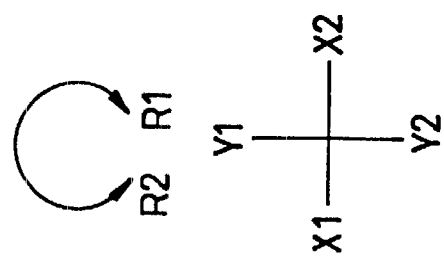

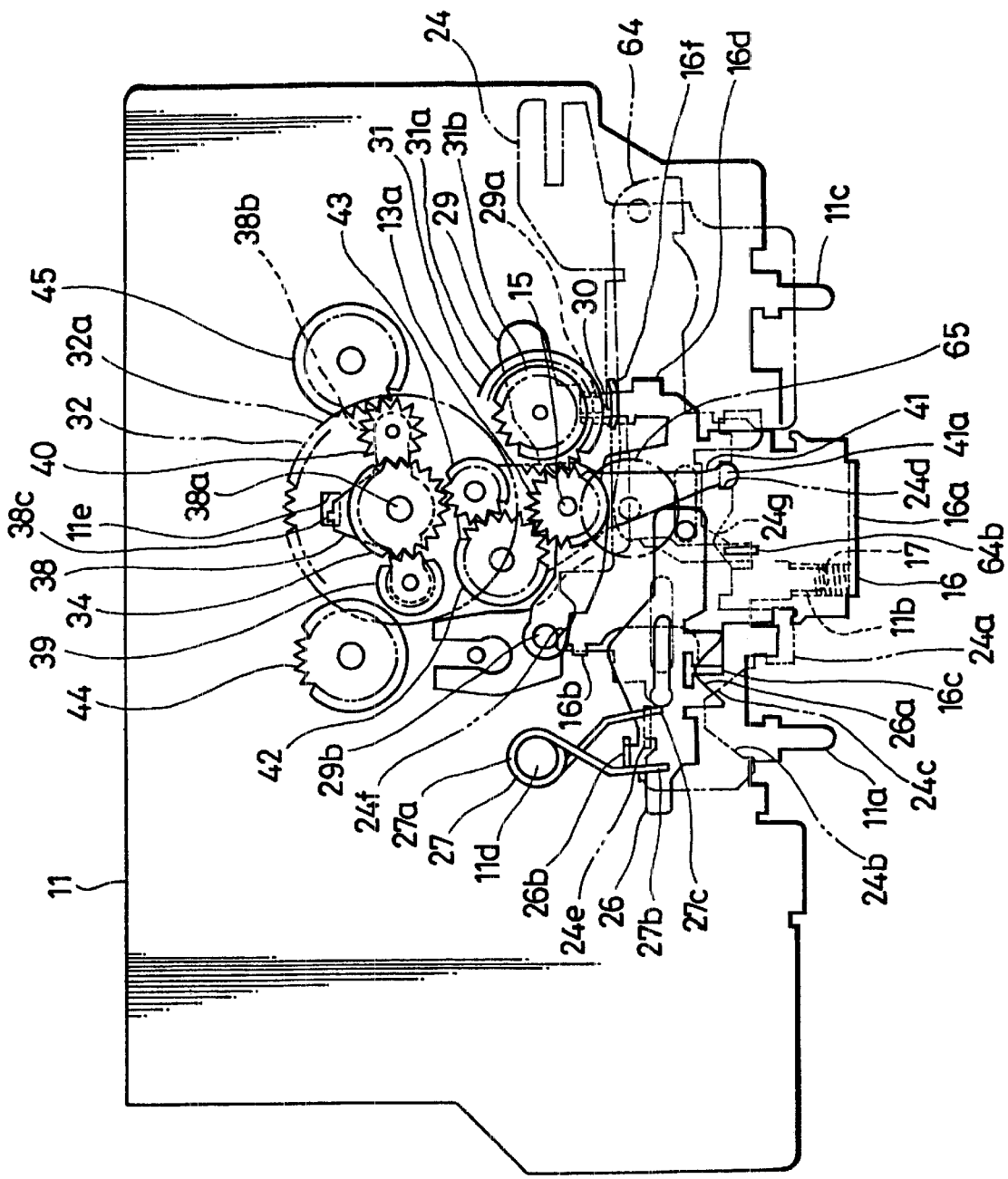
FIG. 24
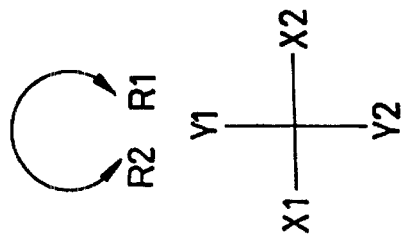

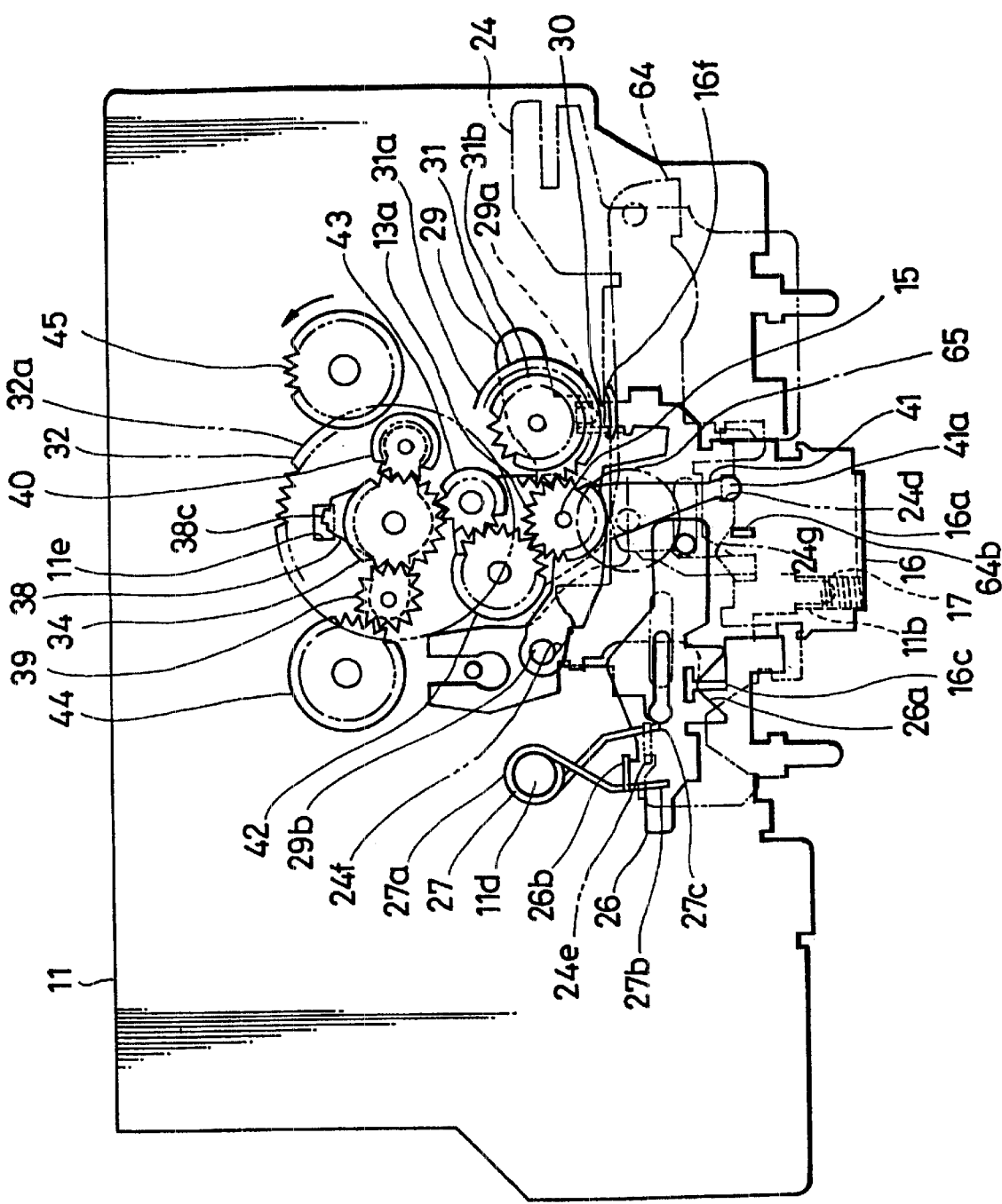
FIG. 26
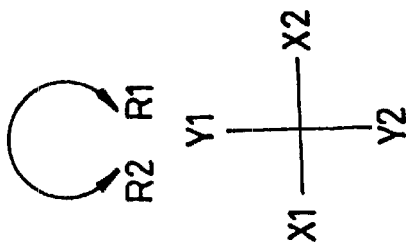

TAPE RUNNING DRIVE DEVICE AND TAPE RECORDING AND OR REPRODUCING DEVICE

TECHNICAL FIELD

The present invention relates to a tape running drive apparatus and a tape recording and/or reproducing apparatus. More particularly, the present invention relates to a tape running drive apparatus bearing an automatic reverse function and a tape recording and/or reproducing apparatus bearing an automatic reverse function.

BACKGROUND ART

Of tape transport apparatus for recording and reproducing a signal by transporting a magnetic tape, e.g. cassette tape players, there has hitherto been known such a cassette tape player having a forward running mode (hereinafter referred to as FWD mode) in which a signal is reproduced by forwarding a magnetic tape in one direction and a reproduction running mode (hereinafter referred to as REV mode) in which a signal is reproduced by transporting a magnetic tape in the direction opposite to the one direction.

In general, such a cassette tape player can be set to a fast-forward mode (hereinafter referred to as FF mode) in which a magnetic tape is fast-forwarded by transporting the magnetic tape at a high speed in the forward direction and a rewind mode (hereinafter referred to as REW mode) in which a magnetic tape is rewound by transporting the magnetic tape at a high speed in the reverse direction.

As shown in FIG. 1, in a conventional cassette tape player a an operator is able to fast-forward a magnetic tape or to rewind a magnetic tape by sliding a slide button c, slidably disposed on an outer casing b, in the S1 direction or in the S2 direction.

Two marks d, e indicative of magnetic tape running directions are attached near the slide button c of the outer casing b. When the operator slides the slide button c in the S1 direction in accordance with the mark d (state in which the slide button c is shown by solid lines in FIG. 1), if the cassette tape player is set to the FWD mode, then the magnetic tape is transported at a high speed in the forward direction, thereby resulting in a magnetic tape fast-forward operation being executed. If the cassette tape player is set to the REV mode, then the magnetic tape is transported at a high speed in the reverse direction, thereby resulting in a magnetic tape rewind operation being executed. When the operator slides the slide button c in the S2 direction in accordance with the mark e (state in which the slide button c is shown by phantom lines in FIG. 1), if the cassette tape player is set to the FWD mode, then the magnetic tape is transported at a high speed in the reverse direction, thereby resulting in the rewind operation being executed. If the tape cassette tape player is set to the REV mode, then the magnetic tape is transported at a high speed in the forward direction, thereby resulting in the fast-forward operation being executed.

However, if the running direction of the magnetic tape is the same when the operating direction of the slide button c is the same in the FWD mode and the REV mode like the above-described prior-art cassette tape player a, then the operation names are changed, i.e. while the magnetic tape is fast-forwarded in the FWD mode, the magnetic tape is rewound in the REV mode or while the magnetic tape is rewound in the FWD mode, the magnetic tape is fast-forwarded in the REV mode. As a result, having considered and confirmed whether the set current mode is the FWD mode or the REV mode, the operator should move the slide button c in the direction in which a desired mode (FF mode or REW mode) is set.

Accordingly, since the operator has to confirm the current mode each time the operator intends to set the cassette tape player to a desired mode, the conventional cassette tape player is inconvenient, and the operator tends to operate the slide button c erroneously.

Although other types of the above-mentioned automatic reverse type tape recorder include a so-called manual switching mechanism in which the operator should operate the slide button c when the tape running direction has to be switched, this manual switching mechanism is generally used when a signal is reproduced from the magnetic tape, and therefore is not required when a signal is recorded on the magnetic tape. Thus, in order to prevent the operator from operating the manual switching mechanism by mistake upon recording, some automatic reverse type tape recorders may include an operation mistake preventing mechanism for preventing the operation mistake by restricting the operations of the manual switching mechanism upon recording.

However, since the operation mistake preventing mechanism provided in the above-mentioned automatic reverse type tape recorder is complicated in mechanism and is comprised of small assemblies, the number of assemblies increases, and the assembly property is poor. In particular, as the above-mentioned automatic reverse type tape recorder becomes miniaturized like a portable small device, the assembly and adjustment thereof become more difficult.

Therefore, the tape running drive apparatus and the tape recording and/or reproducing apparatus according to the present invention can overcome the above-mentioned problems and can make the magnetic tape running apparatus become more convenient.

DISCLOSURE OF INVENTION

A tape running drive apparatus according to the present invention may comprise a pair of reel holder gears respectively engaged with a pair of reels around which a tape is wound, an operation portion including a switching operation portion for switching at least a tape fast-forwarding operation or a rewinding operation when the switching operation portion is moved and a running mechanism for transporting the tape in the positive direction or in the reverse direction by selectively driving the pair of reel holder gears and executing a fast-forwarding operation and a rewinding operation based on the direction in which the switching operation portion is moved and in which when the tape is transported in the positive direction, if the switching operation portion is moved in one direction, then the tape is transported at a high speed in the positive direction to thereby fast-forward the tape and if the switching operation portion is moved in other direction reverse to the one direction, the tape is transported at a high speed in the reverse direction to thereby rewind the tape and in which, upon reverse running mode, if the switching operation portion is moved in one direction, then the tape is transported at a high speed in the reverse direction to thereby fast-forward the tape and if the switching operation portion is moved in other direction, then the tape is transported at a high speed in the positive direction to thereby rewind the tape.

Therefore, in the tape running drive apparatus according to the present invention, if an operator wants to fast-forward the tape, then the operator may constantly move the switching operation portion in one direction. If the operator wants to rewind the tape, then the operator may constantly move the switching operation portion in the direction opposite to the one direction. Thus, the operator need not consider and confirm the current mode each time the operator intends to fast-forward or rewind the tape. Therefore, the tape running drive apparatus can become more convenient, and the operator can be protected from the operation mistake.

A tape recording and/or reproducing apparatus according to the present invention may comprise a pair of reel holder gears respectively provided in reel shafts respectively engaged with a pair of reels around which a tape is wound, an operation portion including a switching operation portion for switching at least a tape fast-forwarding operation or a tape rewinding operation when the switching operation portion is moved and a running mechanism for transporting the tape in the positive direction and transporting the tape in the reverse direction by selectively driving the pair of reel holder gears and executing a fast-forwarding operation and a rewinding operation based on the direction in which the switching operation portion is moved and in which, when the tape is transported in the positive direction, if the switching operation portion is moved in one direction, then the tape is transported at a high speed in the positive direction to thereby fast-forward the tape and if the switching operation portion is moved in other direction reverse to the one direction, then the tape is transported at a high speed in the reverse direction to thereby rewind the tape, and in which, upon reverse running mode, if the switching operation portion is moved in one direction, then the tape is transported at a high speed in the reverse direction to thereby fast-forward the tape and if the switching operation portion is moved in the other direction, then the tape is transported at a high speed in the positive direction to thereby rewind the tape.

Therefore, in the tape recording and/or reproducing apparatus according to the present invention, if an operator wants Auto fast-forward the tape, then the operator may constantly move the switching operation portion in one direction. If the operator wants to rewind the tape, then the operator may constantly move the switching operation portion in the direction opposite to the one direction. Thus, the operator need not consider and confirm the current mode each time the operator intends to fast-forward or rewind the tape. Therefore, the tape recording and/or reproducing apparatus can become more convenient, and the operator can be protected from the operation mistake.

Moreover, the tape recording and/or reproducing apparatus according to the present invention may comprise a pair of reel holder gears respectively provided in reel shafts respectively engaged with a pair of reels around which a tape is wound, an operation portion including a switching operation portion for switching at least the tape positive direction running and the tape reverse direction running when it is moved and a recording operation portion for setting the recording state in which a signal on the tape is recorded, a tape running direction mechanism including a running direction switching lever for transporting the tape in the positive direction and in the reverse direction by selectively driving the pair of reel holder gears and switching the tape running direction when the switching operation portion is operated and a restricting mechanism for restricting the movement of the running direction switching lever when the recording state in which a signal is recorded on the tape is set when the recording operation portion is operated.

Therefore, since the tape recording and/or reproducing apparatus according to the present invention includes the restricting mechanism for restricting the movement of the running direction switching lever when the recording state in which a signal is recorded on the tape is set, the operator can be protected from the operation mistake by restricting the manual switching of the tape running direction upon recording. Moreover, assemblies of the tape recording and/or reproducing apparatus can be decreased, and the mechanism can be simplified in arrangement. At the same time, an excellent assembly property required when the tape recording and/or reproducing apparatus is manufactured can be maintained.

BRIEF DESCRIPTION OF DRAWINGS

FIG. 20 is a schematic enlarged rear view of a magnetic tape driving mechanism, and illustrates the R-REC mode.

FIG. 24 is a schematic enlarged rear view showing the state in which the cassette tape recorder is set to the REVIEW mode from the NOR mode.

FIG. 26 is a schematic enlarged rear view showing the state in which the cassette tape recorder is set to the REVIEW mode from the REV mode.

BEST MODE FOR CARRYING OUT THE INVENTION

A mode for carrying out the invention will be described below with reference to the accompanying drawings.

Incidentally, in the following embodiment, the present invention is applied to a portable cassette tape recorder having a so-called automatic reverse function capable of reproducing a tape in the normal reproduction mode and in the reverse reproduction mode.

Figure 3:
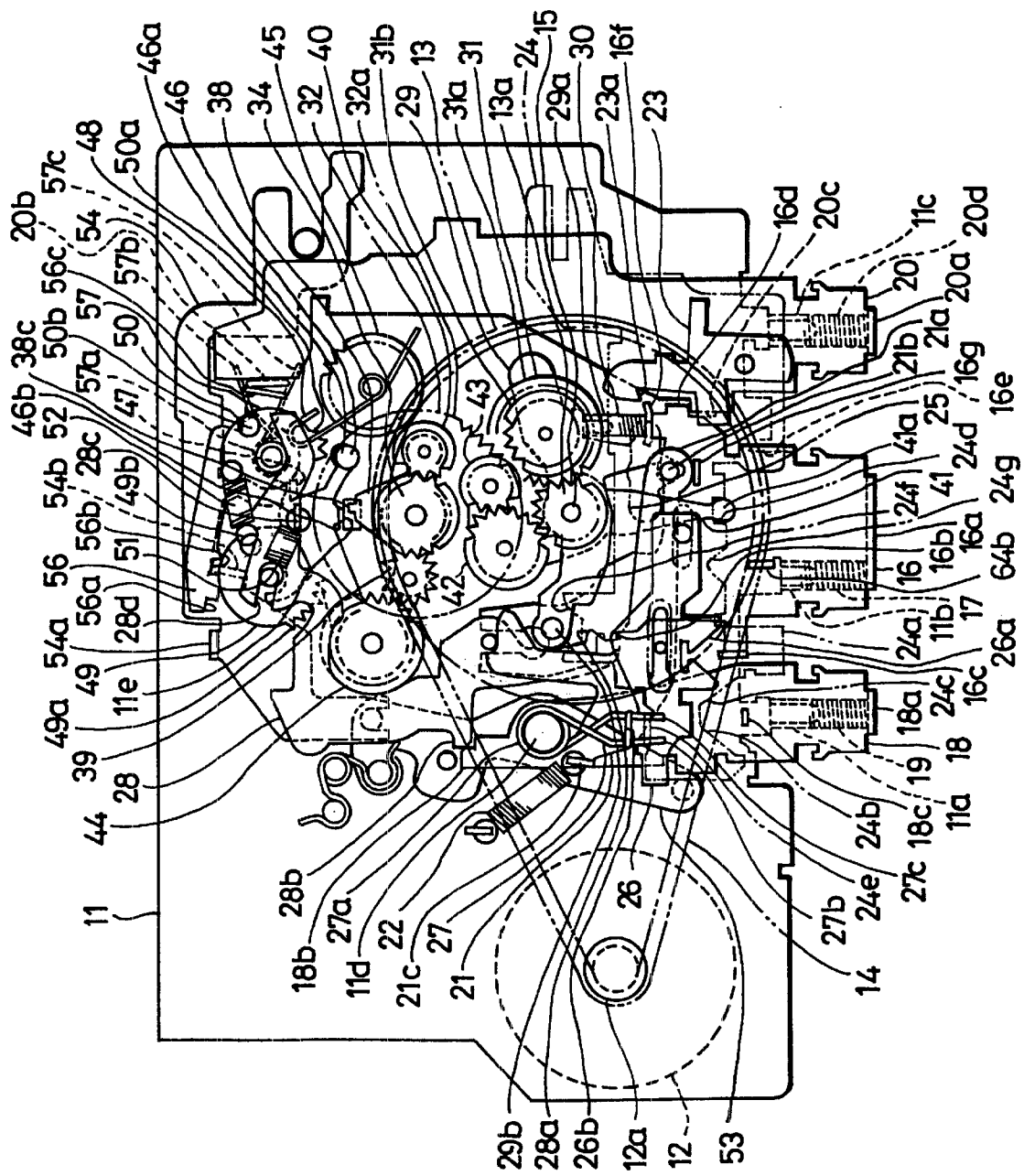
FIG. 3 is a schematic enlarged rear view of a magnetic tape driving mechanism, and illustrates the STOP mode.
Figure 4:
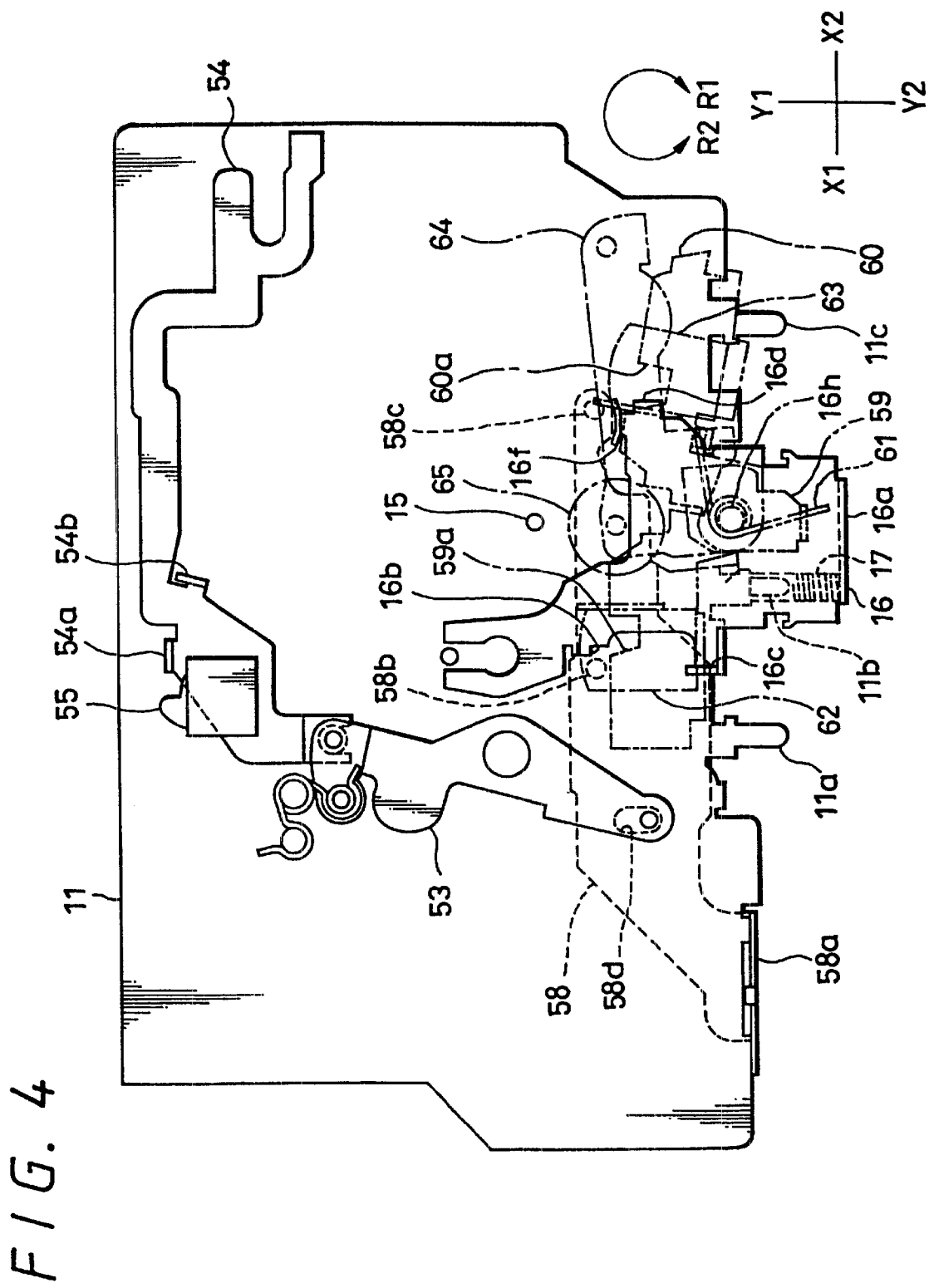
FIG. 4 is a schematic enlarged plan view of a magnetic tape driving mechanism, and illustrates the STOP mode.

Initially, an arrangement of a cassette tape recorder will be described with reference to mainly FIGS. 2 to 6. FIG. 3 shows a magnetic tape drive mechanism mainly from the back side of a mechanical chassis 11 of a cassette tape recorder when the magnetic tape drive mechanism is placed in the stop mode (hereinafter referred to as "STOP mode"). FIG. 4 shows the magnetic tape drive mechanism mainly from the flat surface side of the mechanical chassis 11 of the cassette tape recorder when the magnetic tape drive mechanism is placed in the STOP mode. Incidentally, the respective sheets of drawings all illustrate the magnetic tape drive mechanism from one side so as to understand the magnetic tape drive mechanism more clearly.

Figure 1:
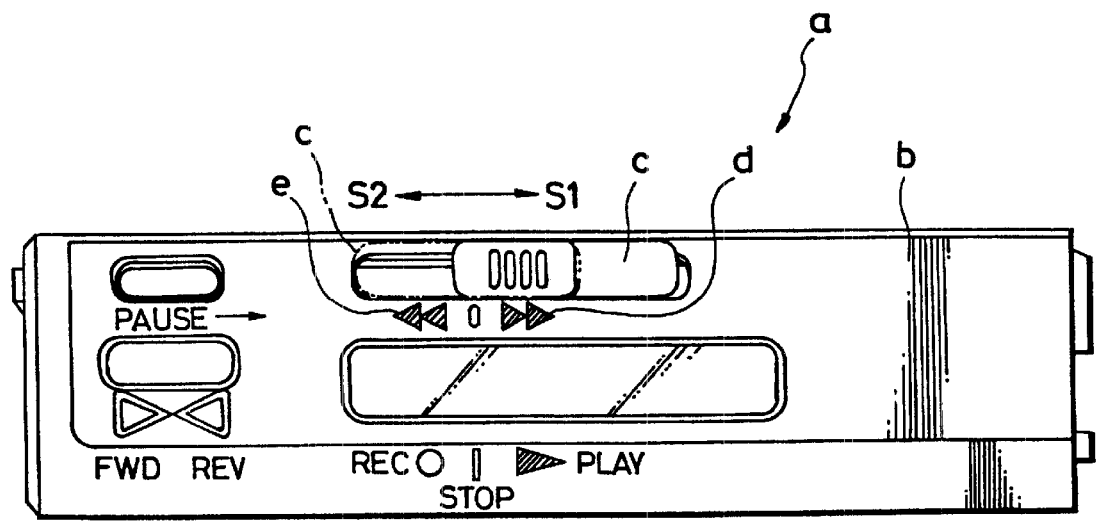
FIG. 1 is a plan view showing a prior-art cassette tape player.
Figure 2:
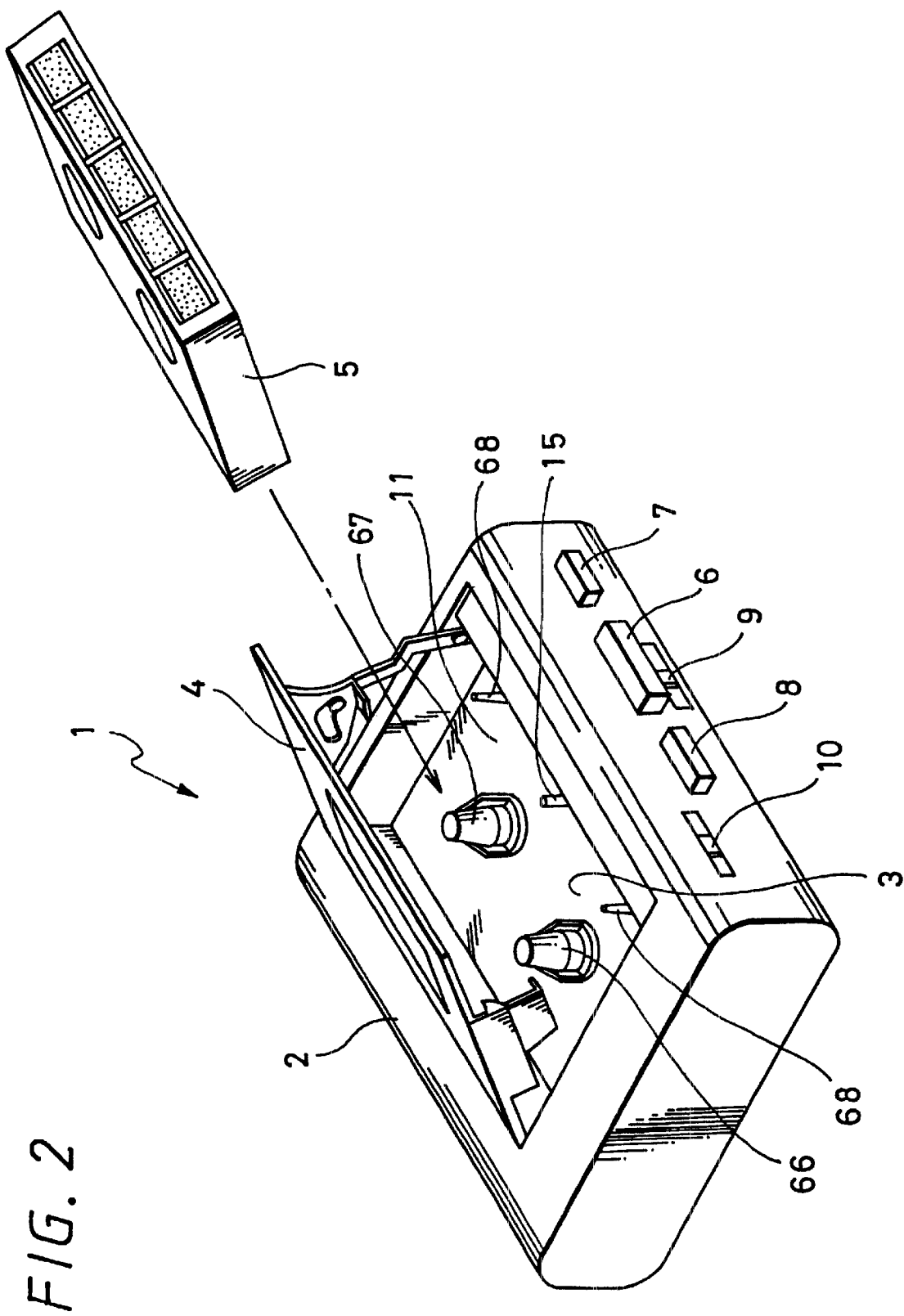
FIG. 2 shows a mode for carrying out the invention together with FIGS. 3 to 29, and is a schematic perspective view of a cassette tape recorder.

As shown in FIG. 2, a tape cassette 1 may include a housing 2 in which there are disposed predetermined respective members and respective mechanisms. A cassette loading portion 3 may be formed in the housing 2, and the cassette loading portion 3 may be opened and closed by a lid 4 which is supported by the housing 2 so as to become freely rotatable. When the lid 4 is rotated to open the cassette loading portion 3, a tape cassette, i.e. a so-called microcassette 5 may be allowed to be loaded into the cassette loading portion 3.

As shown in FIG. 2, the cassette tape recorder 1 may have on its side surface disposed a playback button 6 for setting a playback mode permitting a recorded signal to be reproduced by transporting a magnetic tape, a recording button 7 for setting a recording mode permitting a signal to be recorded by transporting a magnetic tape, a stop button 8 for stopping the transport of the magnetic tape, an FR operation portion 9 for fast-forwarding or rewinding a magnetic tape by transporting a magnetic tape at a high speed when it is slid, and a direction operation portion 10 for switching the running direction of the magnetic tape by its slide operation.

The cassette tape recorder 1 may set a normal reproduction mode (hereinafter referred to as "NOR mode") to reproduce a recorded signal by transporting the magnetic tape in one direction and a reverse reproduction mode (hereinafter referred to as "REV mode") to reproduce a recorded signal by transporting the magnetic tape in the direction opposite to the one direction as the reproduction mode. An operator is able to switch these two running modes by sliding the direction operation portion 10 along the side surface of the housing 2. The cassette tape recorder can also set a normal recording mode (hereinafter referred to as "N-REC mode") for recording a signal by transporting the magnetic tape in one direction and a reverse recording mode (hereinafter referred to as "R-REC mode") for recording a signal by transporting the magnetic tape in the direction opposite to the one direction as the recording mode (hereinafter referred to as "REC mode").

The operator is able to set a fast-forward mode (hereinafter referred to as "FF mode") or a rewind mode (hereinafter referred to as "REW" mode) by sliding the FR operation portion 9 along the side surface of the housing 2 in the STOP mode. Moreover, the operator is able to set a fast-forward mode in the normal reproduction mode (hereinafter referred to as "CUE mode") or a rewind mode in the reverse reproduction mode (hereinafter referred to as "REVIEW mode") by sliding the FR operation portion 9 in the NOR mode or the REV mode.

The operator is able to place the cassette tape recorder 1 in the STOP mode by operating the stop button 8 in any one of the NOR mode, the REV mode, the N-REC mode, the R-REC mode, the FF mode and the REW mode.

As shown in FIG. 3, the mechanical chassis 11 may have on its one side edge formed spring attachment portions 11a, 11b, 11b which are spaced apart from each other.

The mechanical chassis 11 may have disposed therein a drive motor 12 which can be rotated in the positive direction and in the reverse direction. The drive motor 12 may have a rotary shaft to which a pulley 12a is attached. The mechanical chassis 11 may have a flywheel 13 supported such that the flywheel can be rotated freely. A belt 14 may be extended between the pulley 12a and the flywheel 13. Accordingly, the flywheel 13 may be rotated in the same direction as the direction in which the drive motor 12 may be rotated whenever the drive motor 12 is rotated.

The rotary shaft of the flywheel 13 may be extended through the mechanical chassis 1 and thereby protruded in the opposite side as a capstan shaft 15. The flywheel 13 may have at its center portion integrally formed a gear portion 13a having a small diameter.

The mechanical chassis 11 may have supported thereon a tape running lever 16 which can be freely moved in the Y1–Y2 direction shown in FIG. 3. The tape transport lever may be bent at its end edge on the Y2 side to thereby form an attachment portion 16a to which the above-mentioned playback button 6 is attached. One end of a spring 17 attached to the spring attachment portion 11b of the mechanical chassis 11 may be contacted with the attachment portion 16a with a resilience, whereby the tape running lever 16 may be spring-biased in the Y2 direction. Thus, the tape running lever may be located at the moving end of the Y2 direction in the STOP mode.

The tape running lever 16 may have at its side edge on the X1 side shown in FIG. 3 a locked portion 16b and a restricting portion 16c which are separated from each other in the Y direction. The tape running lever may also have at its side edge on the X2 side a pressed portion 16d and a spring stop portion 16e which are spaced apart from each other in the Y direction. A spring supporting portion 16f, which is protruded in the Y1 direction, may be formed in the vicinity of the pressed portion 16d. As shown in FIG. 4, the tape running lever 16 may have an erected pressure member 16g formed at the position nearer to the end edge on the X2 side. Further, the tape running lever 16 may have a rotation supporting point 16h protrusively formed thereon. The rotation supporting point 16h may be protruded toward the side of the mechanical chassis 11 at the position in which it may not interfere with the mechanical chassis 11.

The mechanical chassis 11 may have a stop lever 18 supported thereon in parallel to the tape running lever 16 in such a manner that the stop lever can be freely moved in the Y1–Y2 direction shown in FIG. 3. The stop lever may be bent at its end edge on the Y2 side so as to form an attachment portion 18a. The above-mentioned stop button 8 may be attached to the attachment portion 18a. One end of a spring 19 attached to the spring attachment portion 11a of the mechanical chassis 11 may be contacted with the attachment portion 18a with a resilience, whereby the stop lever 18 may be spring-biased in the Y2 direction. Thus, the stop lever may be located at the moving end of the Y2 direction in the STOP mode.

The stop lever 18 may have a lock releasing portion 18b formed at its end portion on the Y1 side. The stop lever may also have an erected resilient member 18c formed at the portion nearer to the attachment portion 18a.

The mechanical chassis 11 may have a recording lever 20 supported across the tape running lever 16 in the opposite side of the stop lever 18 in such a fashion that the recording lever can be freely moved in the Y1–Y2 direction shown in FIG. 3. The recording lever may be bent at its end edge on the Y2 side so as to form an attachment portion 20a. The above-mentioned recording button 7 may be attached to the attachment portion 20a.

The recording lever 20 may have a spring engagement portion 20b formed at its portion nearer to the Y1 side. The recording lever 20 may include a pressure portion 20c which is located close to or in contact with the pressed portion 16d of the tape running lever 16. One end of a spring 20d attached to the spring attachment portion 11c of the mechanical chassis 11 is brought in resilient contact with the attachment portion 20a, whereby the recording lever 20 may be spring-biased in the Y2 direction. Thus, the recording lever may be located at the moving end of the Y2 direction in the. STOP mode.

The mechanical chassis 11 may include a switch lever 21 over the tape running lever 16 and the stop lever 18 in such a fashion that the switch lever can be rotated freely. The rotary lever 21 may have at its end portion on the X2 side formed a pressed portion 21a. The pressed portion 21a may be protruded at its center portion so as to form an engagement protrusion portion 21b. The switch lever 21 may include at its end portion on the X1 side a switch operation portion 21c which is protruded in the direction in which the switch lever becomes distant from the mechanical chassis 11.

One end of a lock spring 22 may be attached to the base end portion of the switch operation portion 21c of the switch lever 21 as a tension coil spring, whereby the switch lever 21 may be spring-biased in the R1 direction shown in FIG. 3, urging the pressed portion 21a to come in contact with the pressure member 16g of the tape running lever 16 with a resilience. Incidentally, this lock spring 22 has a spring force selected to be considerably smaller than a spring force of a return spring which will be described later on.

The recording lever 20 may support thereon a lock member 23 in such a manner that the lock member can be rotated freely. The lock member 23 may include an engagement portion 23a that can be engaged with the lock portion 16f of the tape running lever 16. When the recording lever 20 is moved in the Y1 direction, the lock member 23 is rotated under spring force of a torsion coil spring, not shown, to the position at which the engagement portion 23a may be engaged with the lock portion 16f. When the recording lever 20, which was moved in the Y1 direction, is moved in the Y2 direction, the engagement portion 23a and the lock portion 16f may be disengaged from each other and thereby the recording lever may be rotated to the original position.

An FR lever 24 may function as a switching operation portion capable of switching the fast-forwarding of the tape and the rewinding of the tape and can be moved in the X1–X2 direction.

The FR lever 24 may be disposed in such a manner that it may overlap the tape running lever 16, the stop lever 18 and the recording lever 20. This lever may be bent at its side edge on the Y2 side so as to form an attachment portion 24a. The above-mentioned FR operation portion 9 may be attached to the attachment portion 24a. The FR lever 24 may include at its side edge on the Y2 side sliding edges 24b, 24c adjacent to the attachment portion 24a. The sliding edges 24b, 24c may be inclined in such a manner that they are being separated from each other in the Y2 direction. The FR lever 24 may include a supporting portion 24d formed across the attachment portion 24a at the position of the opposite side of the sliding edges 24b, 24c.

The FR lever 24 may have at its side edge on the Y1 side a spring engagement portion 24e formed at the position nearer to the X1 side. The FR lever 24 may include a slide contact acting portion 24f protruded in the Y1 direction. The slide contact acting portion 24f may be shaped as nearly V-letter so as to be opened in the Y1 direction. The FR lever 24 may include an acting edge 24g formed between the attachment portion 24a and the supporting portion 24d. The acting edge 24g may be shaped as nearly V-letter so as to be opened in the Y2 direction.

The FR lever 24 may have formed thereon a cam hole 25 of a predetermined shape. The cam hole 25 may include a stop engagement edge 25a located at the center portion and a rewinding engagement edge 25b and a fast-forwarding engagement edge 25c which are located at both sides in the X1–X2 direction across the stop engagement edge 25a. The stop engagement edge 25a may be located nearer to the Y2 side as compared with the rewinding engagement edge 25b and the fast-forwarding engagement edge 25c. In the STOP mode, under spring-biasing force exerted upon the switch lever 21 from the lock spring 22, the engagement protrusion portion 21b is engaged with the stop engagement edge 25a of the cam hole 25.

The FR lever 24 can be moved in the X1–X2 direction with reference to the center position obtained under the condition that the engagement protrusion portion 21b is engaged with the stop engagement edge 25a. When the FR lever 24 is moved in the X1 direction, it may reach the first position at which the engagement protrusion portion 21b is engaged with the fast-forwarding engagement edge 25c. When this lever is moved in the X2 direction, it may reach the second position at which the engagement protrusion portion 21b is engaged with the rewinding engagement edge 25b.

A retained member 26 may be supported between the switch lever 21 and the FR lever 24 in such a fashion that it can be freely moved in the X1–X2 direction. The retained member 26 may include a restricted edge 26a formed at the position opposing to the restricting portion 16c of the tape running lever 16. The restricted edge 26a may comprise a pair of slant edges which are becoming closer to each other in the Y1 direction. The retained member 26 may include a spring engagement portion 26b formed near the spring engagement portion 24e of the FR lever 24.

The mechanical chassis 11 may have a supporting shaft 11d protrusively formed thereon. A return spring 27 may be supported by the supporting shaft 11d. The return spring 27 might be a torsion coil spring, and the supporting shaft 11d may be extended through the coil portion 27a. In the STOP mode, under the condition that resilient contact portions 27b, 27c protruded from a coil portion 27a are intersected with each other, the resilient contact portions may sandwich the spring engagement portion 24e of the FR lever 24 and the spring engagement portion 26b of the retained member 26.

The retained member 26 can be moved in the X1–X2 direction as the FR lever 24 is moved. In the FF mode and the REW mode, the retained member may be moved to the non-acting position at which the retained member is moved as the FR lever 24 is moved as will be described later on. Under the condition that the retained member 26 is restricted from being moved by the restricting portion 16c of the tape running lever 16, even when the FR lever 24 is moved, the retained member is not moved. In the CUE mode and the REVIEW mode, the retained member may be restricted from being moved at the center acting position in the moving direction.

The mechanical chassis 11 may include a running stop lever 28 supported thereon in such a manner that the running stop lever can be rotated freely. A part of the running stop lever 28 may be disposed between the tape running lever 16 and the switch lever 21. The running stop lever 28 may be shaped as nearly inverted L-letter and may comprise a lock portion 28a formed at its end portion in the Y2 direction side, an acted portion 28b positioned in an opposing relation to the lock releasing portion 18b of the stop lever 18 and a spring stop portion 28c formed at its end portion in the Y1 direction side. The running stop lever 28 may partly notched at its end portion in the Y1 direction so as to form an engagement notch 28d.

The mechanical chassis 11 may include a driving power transmission lever 29 supported thereon in such a fashion that the driving power transmission lever can be freely rotated around the same rotation supporting point as that of the capstan shaft 15. The driving power transmission lever may include a spring attachment portion 29a formed at the position opposing to the lock portion 16f of the tape running lever 16 located in the portion nearer to one end and an acted protrusion portion 29b formed at its other end portion. A transmission spring 30, which might be a compression coil spring, may be attached to the spring attachment portion 29a of the driving power transmission lever 29. One end of the transmission spring 30 may be contacted with the lock portion 16f of the tape running lever 16 with a resilience.

The driving power transmission lever 29 may include a transmission gear 31, which might be a double-gear, supported at its portion nearer to one end. The transmission gear 31 may include a large diameter portion 31a and a small diameter portion 31b. The gear 13a of the flywheel 13 may be meshed with the large diameter portion 31a of the transmission gear 31.

Figure 5:
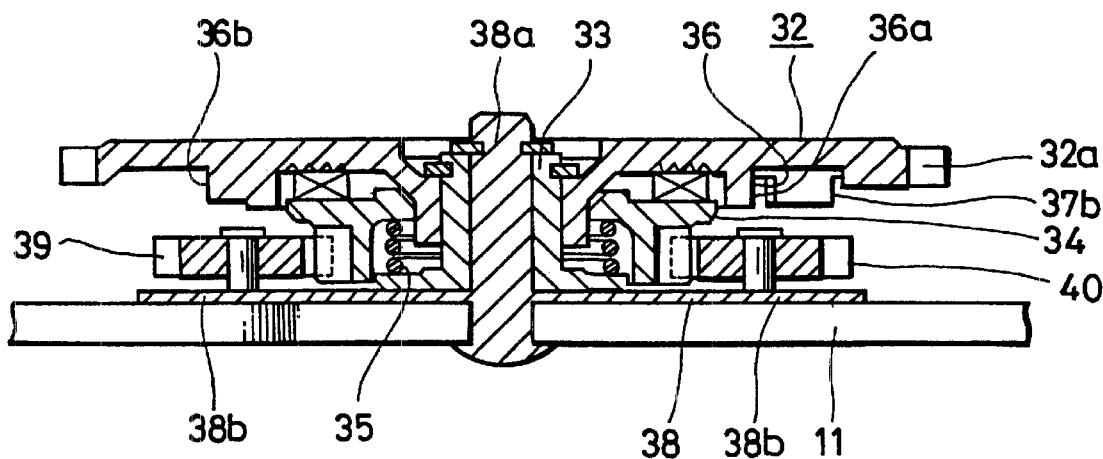
FIG. 5 is an enlarged cross-sectional view showing a cam member, a limiter gear and an oscillating lever.
Figure 6:
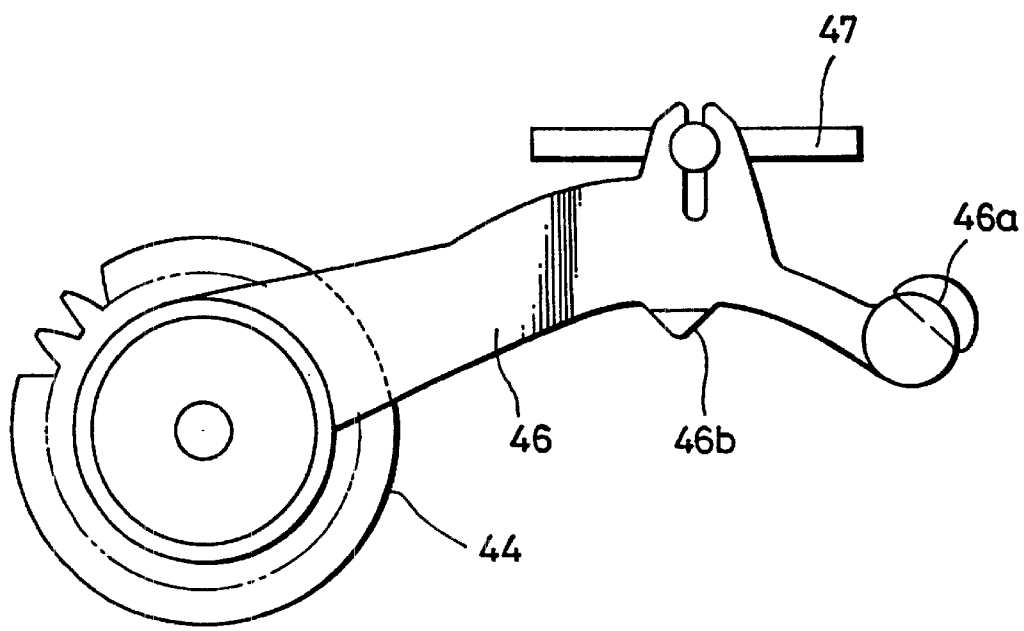
FIG. 6 is an enlarged view showing a swing lever.

As shown in FIGS. 3 and 5, the mechanical chassis 11 may include a cam member 32 of nearly a disk-shape disposed therein in such a manner that the cam member can be freely rotated through a bearing member 33. A gear portion 32a may be formed around the outer peripheral portion of the cam member 32. A limiter gear 34 may be coaxially contacted with the cam member 32 with a resilience through a compression coil spring 35. Accordingly, because friction forces generated between the cam member 32 and the limiter gear 34 are different from each other, the cam member 32 and the limiter gear 34 are rotated as if they were formed as one body. As a result, the cam member 32 can be rotated relative to the limiter gear 34.

As shown in FIGS. 11 to 16, a slide contact cam portion 36 whose outward form is nearly oval may be formed at the portion of the outer peripheral side of the limiter gear 34 on the surface of the side in which the limiter gear 34 of the cam member 32 is located. Approximately ¾ of the slide contact cam portion 36 may be formed as an arcuate portion 36a, and other portion of the slide contact cam portion may be formed as a displacement portion 36b which approaches the outer periphery of the cam member 32 as it becomes distant from the arcuate portion 36a.

The cam member 32 may have on its surface of the side in which the limiter gear 34 is located a pair of protruded cam portions 37a, 37b which are separated from each other in the circumferential direction. The protruded cam portions 37a, 37b may be located on the opposite side of the displacement portion 36b of the slide contact cam portion 36 across the rotary shaft of the cam member 32.

As shown in FIGS. 3 to 5, an oscillating lever 38 may be coaxial with the limiter gear 34 and supported between the mechanical chassis 11 and the limiter gear 34 in such a fashion that the oscillating lever can be rotated freely. The oscillating lever 38 may be brought in resilient contact with the limiter gear 34 through the compression coil spring 35.

The oscillating lever 38 may comprise a shaft portion 38a inserted into the bearing member 33 and a gear supporting portion 38b which are integrally formed as one body. The gear supporting portion 38b may support at its respective end portions follower gears 39, 40 in such a fashion that the follower gears 39, 40 can be rotated freely. The follower gears 39, 40 may be meshed with the limiter gear 34. The oscillating lever 38 may have a stopper member 38c formed at its gear supporting portion 38b. The stopper member 38c may be located within the stopper hole 11e defined on the mechanical chassis 11.

The mechanical chassis 11 may support a rotating lever 41 extended in approximately the Y direction in such a manner that the rotating lever may be coaxial with the capstan shaft 15 and can be rotated freely. A part of the rotating lever 41 may be disposed between the mechanical chassis 11 and the drive power transmission lever 29. The rotating lever 41 may have a supported portion 41a formed at its end portion on the Y2 side. The supported portion 41a may be engaged with the supporting portion 24d of the FR lever 24 and thereby supported so as to become freely rotatable. The rotating lever 41 may support at its end portion on the Y1 direction side a first gear 42 and a second gear 43, which are meshed with each other, in such a manner that the first and second gears can be rotated freely. The gear portion 13a of the flywheel 13 may be meshed with the first gear 42.

Since the supported portion 41a is supported by the supporting portion 24d of the FR lever 24, the rotating lever 41 can be rotated as the FR lever 24 is moved in the X1–X2 direction. When the FR lever 24 is moved in the X1 direction, the first gear 42 may be meshed with the limiter gear 34. When the FR lever 24 is moved in the X2 direction, the second gear 43 may be meshed with the limiter gear 34. Incidentally, in the STOP mode, neither the first gear 42 nor the second gear 43 may be meshed with the limiter gear 34.

The cam member 32 may have a pair of reel holder gears 44, 45 disposed at its both sides. The reel holder gear 44 located on the X1 direction side may support thereon a swinging lever 46, which can be rotated in accordance with the rotating direction of the reel holder gear 44, in such a manner that the swing lever can be rotated freely. The swing lever 46 may be disposed in such a manner that it can be extended in approximately the X direction. One end of the swing lever may be supported by the reel holder gear 44 and the other end thereof may be formed as a spring receiving portion 46a. The swing lever 46 may have at its intermediate portion a slide contact portion 46b which is protruded toward the center side of the cam member 32. The swing lever 46 may have a pressure plate 47 supported at its portion of the opposite side of the half portion in which the slide contact portion 46b is formed in the Y direction in such a manner that the pressure plate can be swung freely.

The reel holder gear 45, which is located in the X2 direction, may support thereon a biasing spring 48 which can be rotated in the direction corresponding to the rotating direction of the reel gear 44. When the reel holder gear 45 is rotated in a predetermined direction, one end portion of the biasing spring 48 contacts with the spring receiving portion 46a of the swing lever 46 with a resilience thereby to cause the slide contact portion 46b of the swing lever 46 to come in slidable contact with the slide contact cam portion 36 of the cam member 32.

In the vicinity of the cam member 32, there are supported a running reversing gear 49 and a running stop gear 50 which are slightly spaced apart from each other in such a manner that they can be rotated freely. The running reversing gear 49 and the running stop gear 50 may be selectively meshed with the gear portion 32a of the cam member 32 in a predetermined state. The running reversing gear 49 may also have a function as a restriction releasing member which can temporarily release the restriction exerted upon the movement of a running direction switching lever which will be described later on.

The running reversing gear 49 may be formed by integrating a nearly semicircular portion and a portion protruded in the circumferential direction from the outer peripheral portion located at approximately the opposite side of the running stop gear 50 of that portion. A gear 49a having several teeth may be formed on the protruded portion. The running reversing gear 49 may have at its approximately hemispherical portion an acting shaft 49b which is protruded toward the side of the mechanical chassis 11. The running reversing gear 49 may also have at its approximately hemispherical portion a pressed portion 49c formed at the position opposing to the pressure plate 47 supported to the swing lever 46.

A coil spring 51 may be extended between the center axis of the running reversing gear 49 and the spring stop portion 28c of the running stop lever 28, whereby the running stop lever 28 may be spring-biased in the R2 direction shown in FIG. 3. The center axis of the running reversing gear 49 may be located within the engagement notch 28d of the running stop lever 28.

The running stop gear 50 may be formed by integrating approximately a semicircular portion and a portion protruded in the circumferential direction from the outer peripheral portion located approximately on the opposite side of the running reversing gear 49 of that portion. A gear 50a having several teeth may be formed on the protruded portion. The running stop gear 50 may have at its approximately hemispherical portion an acting shaft 50b which is protruded toward the opposite side of the side of the mechanical chassis 11. The running stop gear 50 may have at its approximately hemispherical portion a pressed portion 50c at the position opposing the pressure plate 47 supported by the swing lever 46.

A coil spring 52 may be extended between the running stop gear 50 and the running reversing gear 49, whereby the running reversing gear 49 and the running stop gear 50 may be spring-biased in the direction in which the gear 49a and the gear 50a are separated from each other. In the STOP mode, neither of the gear 49a nor the gear 50a may be meshed with the gear portion 32a of the cam member 32.

As shown in FIG. 4, an intermediate lever 53 may be supported by the mechanical chassis 11 in such a manner that it can be rotated freely. One end portion of the intermediate lever 53 may be coupled to one end portion of the running direction switching lever 54 in such a manner that it can be rotated freely.

The running direction switching lever 54 may be extended in approximately the X direction and thereby supported by the mechanical chassis 11 in such a manner that it can be freely moved in the X1–X2 direction. The running direction switching lever 54 may include a switch member 54a protruded to the opposite side of the mechanical chassis 11 and an acted portion 54b located in an opposing relation to the acting shaft 49b of the running reversing gear 49.

Figure 8:
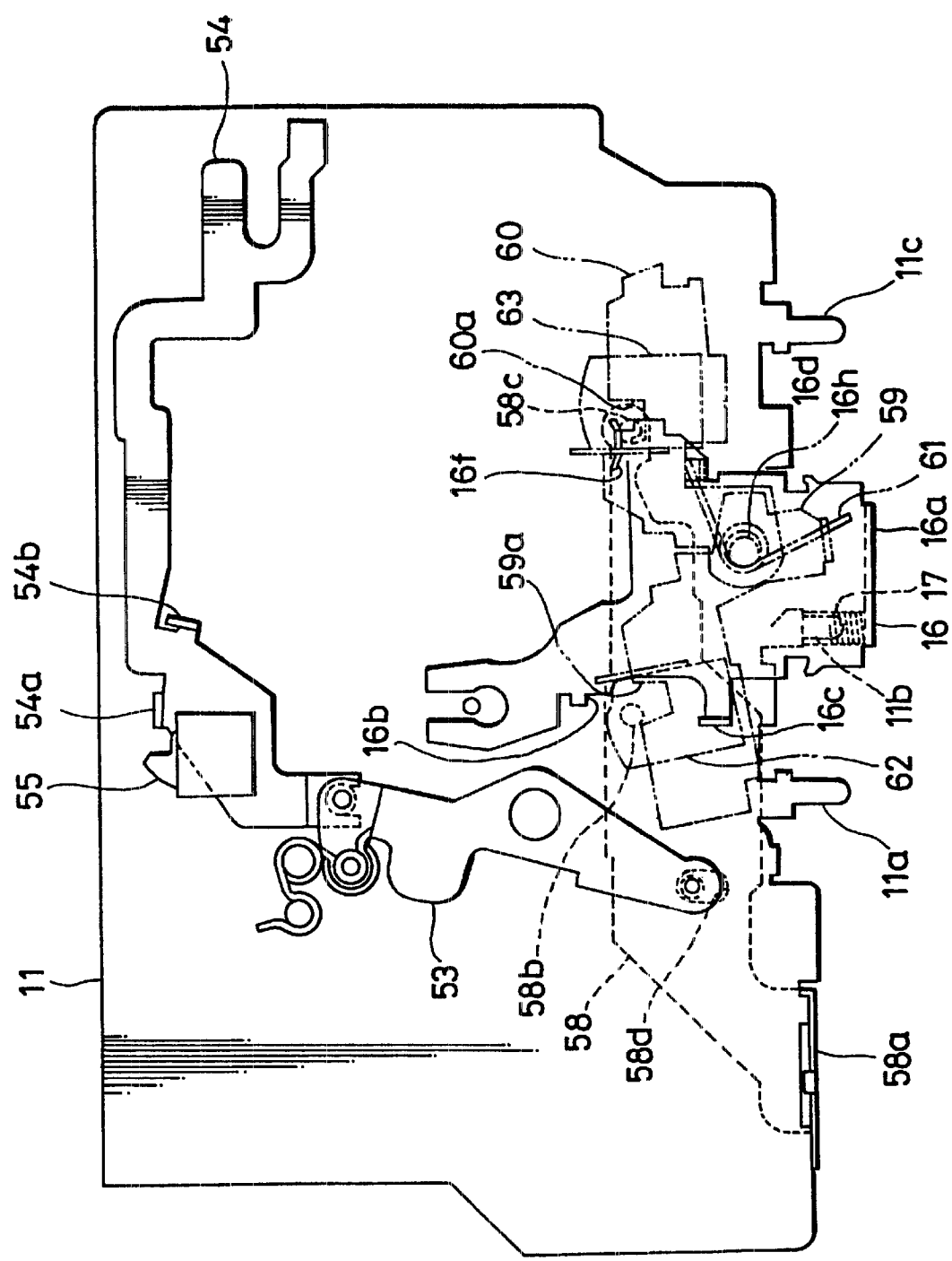
FIG. 8 is a schematic enlarged plan view of a magnetic tape driving mechanism, and illustrates the NOR mode.

As shown in FIGS. 4 and 8, a change-over switch 55 may be disposed in the vicinity of the switch member 54a of the running direction switching lever 54. When the change-over switch 55 is operated by the switch member 54a, the tape can be transported in the reverse direction.

The mechanical chassis 11 may support a movement restricting lever 56 supported on the same axis of the running stop gear 50 in such a manner that the movement restricting lever can be rotated freely. The movement restricting lever 56 may include at its one end portion a first restricting edge 56a and a second restricting edge 56b which are slightly spaced apart from each other. The movement restricting lever may also include the other end portion thereof formed a spring engagement portion 56c. A rotating shaft of the movement restricting lever 56 may be inserted into a coil portion 57a of a torsion coil spring 57. As a result, in the STOP mode, under the condition that resilient contact portions 57b, 57c, protruded from the coil portion 57a, are intersected with each other, the resilient contact portions may sandwich the spring engagement portion 20b of the recording lever 20 and the spring engagement portion 56c of the movement restricting lever 56.

As shown in FIG. 4, the mechanical chassis 11 may support on its surface opposite to the side in which the above-mentioned respective levers and the like are disposed a head switching lever 58 in such a manner that the head switching lever can be freely moved in the X1–X2 direction. The head switching lever 58 may be extended along the X1–X2 direction. The head switching lever may have at its one end portion formed an attachment portion 58a. The direction operation portion 10 may be attached to the attachment portion 58a.

The head switching lever 58 may include restricting protruded portions 58b, 58c protruded toward the opposite side of the mechanical chassis 11 in such a fashion that the restricting protruded portions are spaced apart from each other in the X1–X2 direction. The head switching lever 58 may have a coupling hole 58d defined thereon. The other end portion of the intermediate lever 53 may be engaged with the coupling hole 58d in such a manner that it can be rotated freely. Thus, the intermediate lever 53 and the head switching lever 58 can be coupled with each other.

Accordingly, when the head switching lever 58 is moved in the X1 direction, the running direction switching lever 54 may be moved in the X2 direction through the intermediate lever 53. When the head switching lever 58 is moved in the X2 direction, the running direction switching lever 54 is moved in the X1 direction through the intermediate lever 53, permitting the switch member 54a to operate the changeover switch 55. Incidentally, the moving end of the X1 direction and the moving end of the X2 direction in the moving direction of the head switching lever 58 may be respectively served as a first restricting position and a second restricting position at which the movement of a first base or a second base, which will be respectively described later on, is restricted.

A first base 59 and a second base 60 may be disposed over the head switching lever 58 in such a manner that they can be respectively rotated around the rotation supporting point 16h formed on the tape running lever 16. The first base 59 and the second base 60 may have escape concave portions 59a, 60a formed thereon, respectively.

A torsion coil spring 61 may be interposed between the first base 59 and the second base 60, whereby the first base 59 may be spring-biased in the R1 direction shown in FIG. 4 and the second base 60 may be spring-biased in the R2 direction shown in FIG. 4. A first magnetic head 62 and a second magnetic head 63 are attached to the first base 59 and the second base 60, respectively.

Figure 17:
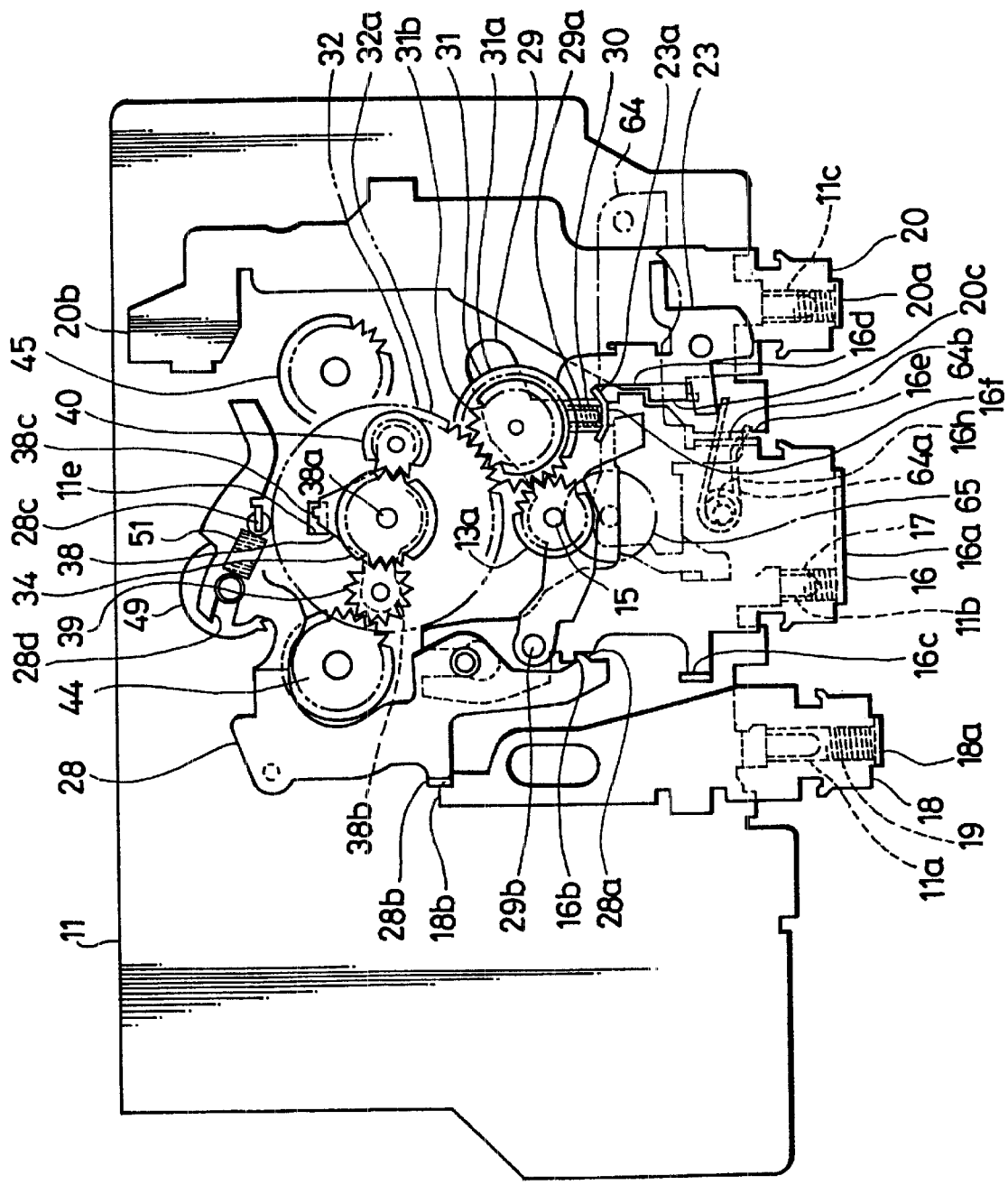
FIG. 17 is a schematic enlarged rear view of a magnetic tape driving mechanism, and illustrates the N-REC mode.

The second base 60 may support thereon a supporting member 64 in such a manner that the supporting member can be freely rotated around the end portion on the side of the X2 direction. The supporting member 64 may have a pinch roller 65 rotatably supported thereon. As shown in FIG. 17, a torsion coil spring 64a may be interposed between the supporting member 64 and the spring stop portion 16e of the tape running lever 16 so that, when the second base 60 is moved in the Y1 direction, the pinch roller 65 is urged against the capstan shaft 15 by the action of the torsion coil spring 64a. The second base has an acted member 64b formed thereon. The acted member 64b may be inserted into an insertion hole, not shown, of the tape running lever 16 and thereby engaged with the acting edge 24g of the FR lever 24.

As shown in FIG. 2, a pair of reel shafts 66, 67, which can be rotated in accordance with the rotation of the reel holder gears 44, 45, may be disposed on the cassette loading portion 3 of the cassette tape recorder 1. Positioning pins 68, 68, which are used to properly position the tape cassette 5, may be protruded on the cassette loading portion 3.

Respective operations of the cassette tape recorder 1 will be described below.

Initially, the manner in which the cassette tape recorder is set from the STOP mode to the NOR mode will be described with reference to FIGS. 7 and 8.

Figure 7:
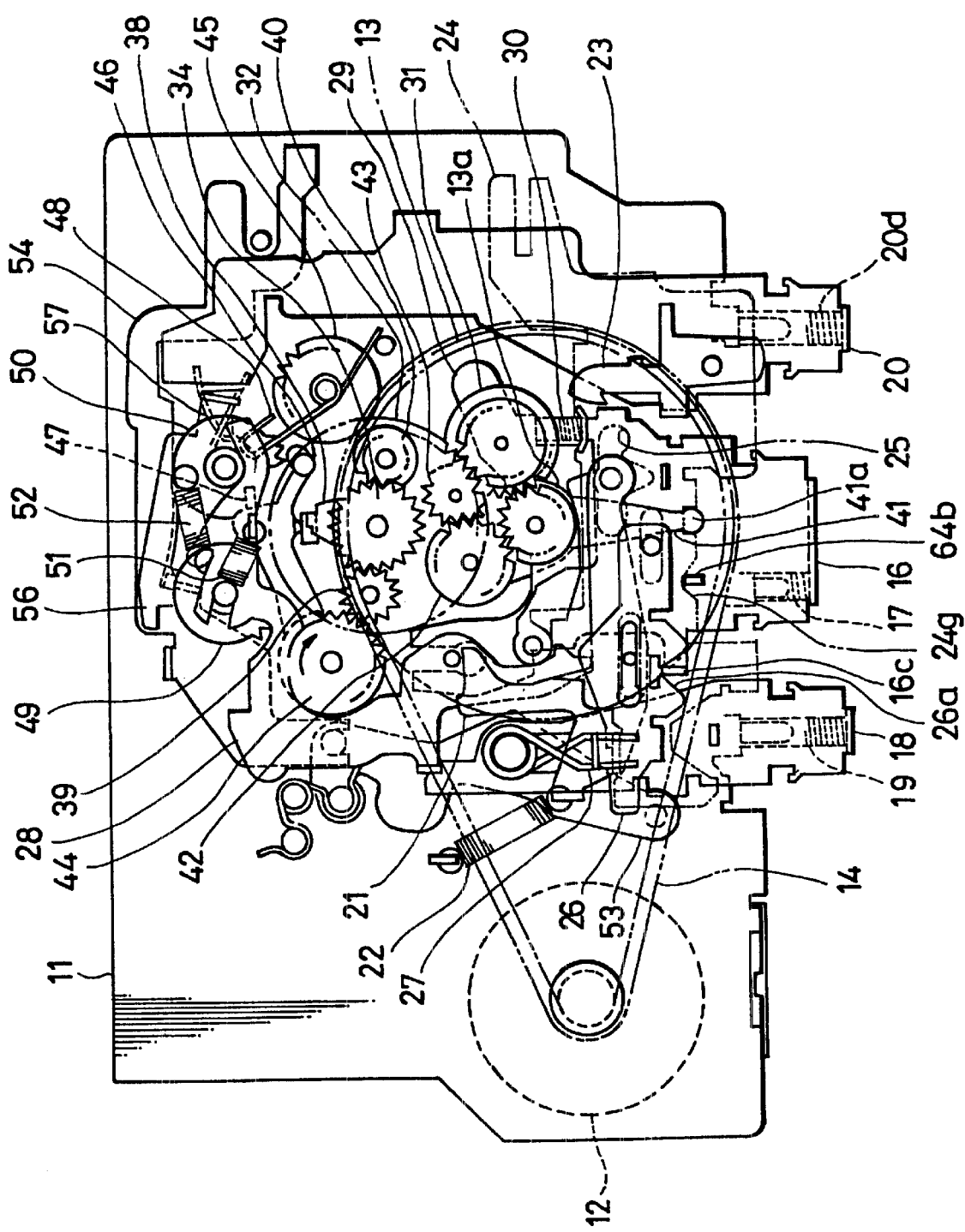
FIG. 7 is a schematic enlarged rear view of a magnetic tape driving mechanism, and illustrates the NOR mode.

In the STOP mode, under the condition that the head switching lever 58 is located at the first restricting position which is the position of the X1 direction side, when an operator moves the tape running lever 16 in the Y1 direction shown in FIG. 7, the pressure member 16g presses the pressed portion 21a of the switch lever 21 in the Y1 direction so that the switch operation portion 21c operates a drive switch, not shown, to rotate the drive motor 12. A drive force of the drive motor 12 is transmitted through the belt 14 to the flywheel 13, whereby the transmission gear 31 may be rotated through the gear portion 13a. Incidentally, in the STOP mode, since the FR lever 24 is located at the center position, the first gear 42 and the second gear 43 supported by the rotating lever 41 are not meshed with the limiter gear 34.

When the operator moves the tape running lever 16 in the Y1 direction, the locked portion 16b presses the lock portion 28a of the running stop lever 28, permitting the running stop lever 28 to be slightly rotated in the R1 direction. Further, the running stop lever 28 that had been rotated a little in the R1 direction as the tape running lever 16 was moved in the Y1 direction may be rotated in the R2 direction by the action of the coil spring 51. As a consequence, the locked portion 16b may be locked to the lock portion 28a.

At the same time, when the tape running lever 16 is moved in the Y1 direction, the drive power transmission lever 29 coupled through the transmission spring 30, which is brought in resilient contact with the lock portion 16f, may be rotated with the result that the small gear portion 31b of the transmission gear 31 supported by the drive power transmission lever 29 may be meshed with the cam gear 32a of the cam member 32. The follower gears 39, 40 supported by the oscillating lever 38 may be rotated through the transmission gear 31, the cam member 32, the limiter gear 34 which were rotated by the rotation of the gear portion 13a. The bearing member 33 also may be rotated in accordance with the rotation of the cam gear 32.

At that very moment, since the limiter gear 34 is rotated in the R1 direction shown in FIG. 7 in accordance with the direction in which the drive motor 12 is rotated and the bearing member 33 is brought in resilient contact with the oscillating lever 38 through the compression coil spring 35, the oscillating lever 38 may be rotated in the R1 direction up to the position at which the stopper member 38c is restricted by the edge portion of the stopper hole 11e of the mechanical chassis 11. As the oscillating lever 38 is rotated in the R1 direction, the follower gear 39 may be meshed with the reel holder gear 44 and thereby the reel holder 66 can be rotated.

Under the condition that the head switching lever 58 is located at the first restricting position which is the position on the side of the X1 direction, as described above, since the running direction switching lever 54 was already moved in the X2 direction through the intermediate lever 53, the change-over switch 55 is not operated. Under the condition that the head switching lever 58 is located at the first restricting position, when the operator moves the tape running lever 16 in the Y1 direction, the first base 59 and the second base 60 may be moved in the Y1 direction as the tape running lever 16 is moved as shown in FIG. 8. As the second base 60 is moved, the pinch roller 65 may be moved in the Y1 direction and thereby urged against the capstan shaft 15 through the magnetic tape.

When the first base 59 and the second base 60 are moved in the Y1 direction, since the head switching lever 58 is located at the first restricting position, the side edge of the first base 59 comes in contact with the restricting protruded portion 58b of the head switching lever 58. On the other hand, since the restricting protruded portion 58c is located in the escape concave portion 60a of the second base 60, the second base may be rotated around the rotation supporting point 16h in the R2 direction under spring force of the torsion coil spring 61 so that the second magnetic head 63 may be brought in contact with the magnetic tape.

As described above, as shown in FIGS. 7 and 8, the follower gear 39 and the reel holder gear 44 are meshed with each other, and the second magnetic head 63 is brought in contact with the magnetic tape, whereby the operator can set the cassette tape player to the NOR mode. In this mode, the tape may be supplied by the pinch roller 65 and the capstan shaft 15 and thereby rewound by the reel holder 66

When the operator intends to finish the reproduction operation of the signal recorded on the tape, the operator should move the stop lever 18 in the Y1 direction. When the operator moves the stop lever 18 in the Y1 direction, the lock releasing portion 18b presses the acted portion 28b of the running stop lever 28 to allow the running stop lever 28 to be rotated in the Y1 direction. Accordingly, the tape running lever 16 may be released from the locked state, whereby the tape running lever 16 may be moved in the Y2 direction by the action of the spring 17 and thereby returned to the original position at which the tape running lever had been located before it is moved. Concurrently therewith, the switch lever 21 is moved in the Y2 direction by the action of the lock spring 22 and thereby returned to the original position so that the switch operation portion 21c may be released from the operation of the drive switch, thereby resulting in the drive motor 12 being de-energized.

As the tape running lever 16 is moved in the Y2 direction, the drive power transmission lever 29 also may be returned to the original position, whereby the transmission gear 31 and the cam member 32 may be released from being meshed with each other. As a result, the rotation of the reel holder 66 can be stopped. Further, the second magnetic head 63 and the pinch roller 65 also may be returned to the original positions. Therefore, the operator can place the cassette tape recorder in the STOP mode. Incidentally, if the operator releases the stop lever 18 from being operated, then under spring force of the spring 19, the stop lever can be returned to the original position at which the stop lever had been located before it is moved.

Incidentally, the operator can place the cassette tape player in the STOP mode from the REV mode, which will be described later on, by moving the stop lever 18 in the Y1 direction similarly as described above. As will be described later on, under the condition that the cassette tape player is set to the REC mode, although the recording lever 20 is locked by the running stop lever 28 through the tape running lever 16, the operator can set the cassette tape player in the STOP mode from this REC mode (N-REC mode and R-REC mode) by moving the stop lever 18 in the Y1 direction similarly as described above.

The manner in which the operator may set the cassette tape player in the REV mode from the STOP mode will be described next with reference to FIGS. 9 and 10.

When the head switching lever 58 is located at the first restricting position which is the position on the side of the X1 direction, the head switching lever 58 is moved to the second restricting position by moving the head switching lever 58 in the X2 direction. When the head switching lever 58 is moved to the second restricting position, the running direction switching lever 54 is moved in the X1 direction through the intermediate lever 53, permitting the switch member 54a to operate the change-over switch 55. Accordingly, the drive motor 12 becomes rotatable in the direction opposite to the direction in which the drive motor is rotated when the cassette tape player is placed in the NOR mode. Thus, the cassette tape player becomes able to transport the magnetic tape in the reverse direction.

Figure 9:
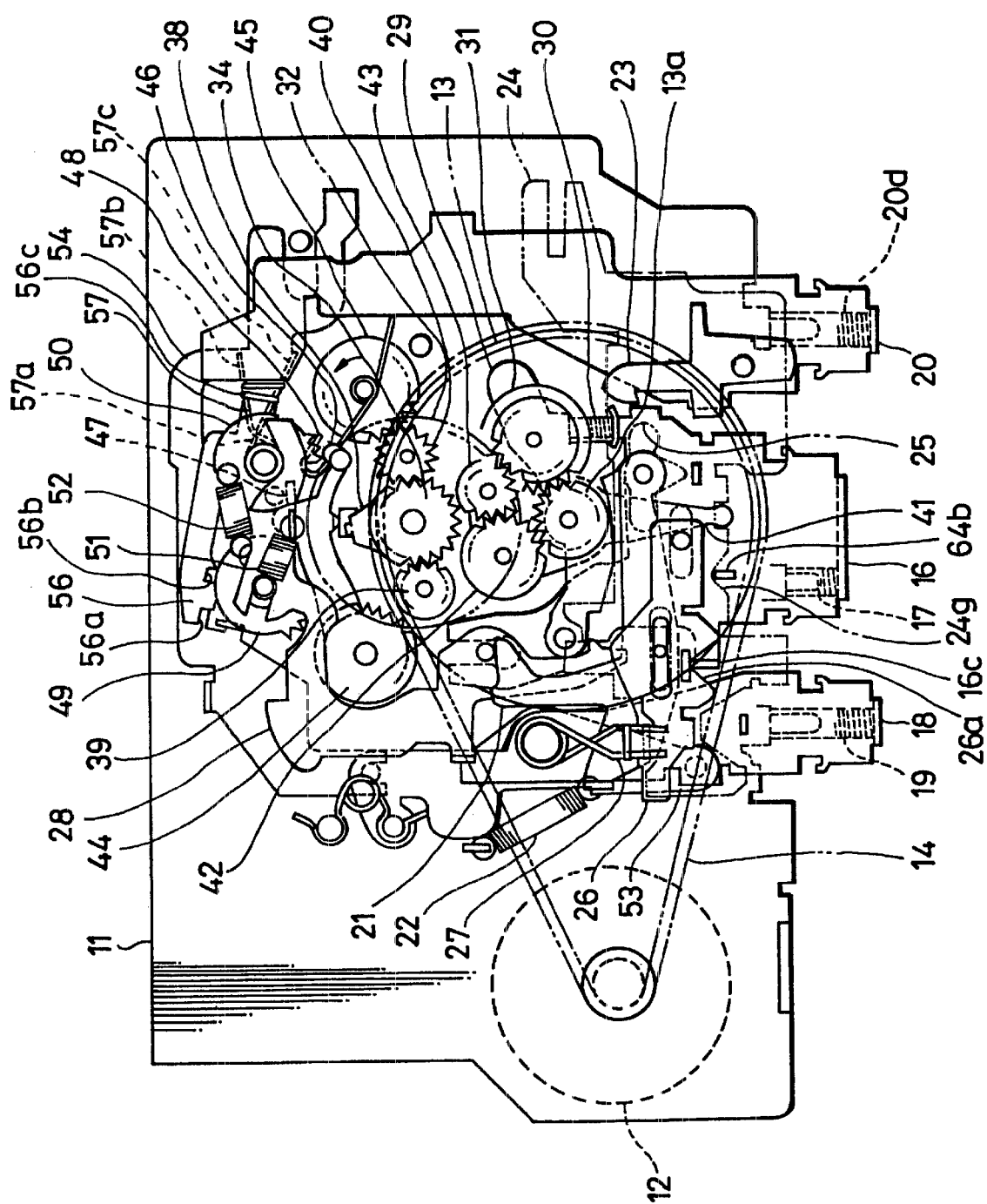
FIG. 9 is a schematic enlarged rear view of a magnetic tape driving mechanism, and illustrates the REV mode.

Under the condition that the head switching lever 58 is located at the second restricting position, when the operator moves the tape running lever 16 in the Y1 direction shown in FIG. 9, the switch operation portion 21c can energize the drive switch, not shown, similarly to the above-mentioned NOR mode thereby to rotate the drive motor 12. Incidentally, the drive motor 12 may be rotated in the direction opposite to the direction in which the drive motor is rotated when the cassette tape player is placed in the NOR mode as described above. The drive power of the drive motor 12 may be transmitted to the transmission gear 31. Incidentally, also in the NOR mode, since the FR lever is located at the center position, neither the first gear 42 nor the second gear 43 supported by the rotating lever 41 may be meshed with the limiter gear 34.

When the operator moves the tape running lever 16 in the Y1 direction, the tape running lever 16 is locked to the running stop lever 28 similarly to the case of the NOR mode. The cam members 32, the limiter gear 34 and the follower gears 39, 40 are rotated through the transmission gear 31.

At that time, the limiter gear 34 is rotated in the R2 direction shown in FIG. 7 in accordance with the direction in which the drive motor 12 is rotated. As a consequence, the oscillating lever 38 may be rotated in the R2 direction up to the position at which the stopper member 38c is restricted by the edge portion of the stopper hole 11e in the mechanical chassis 11. As the oscillating lever 38 is rotated in the R2 direction, the follower gear 40 is meshed with the reel holder gear 45 and thereby the reel holder 67 can be rotated.

Figure 10:
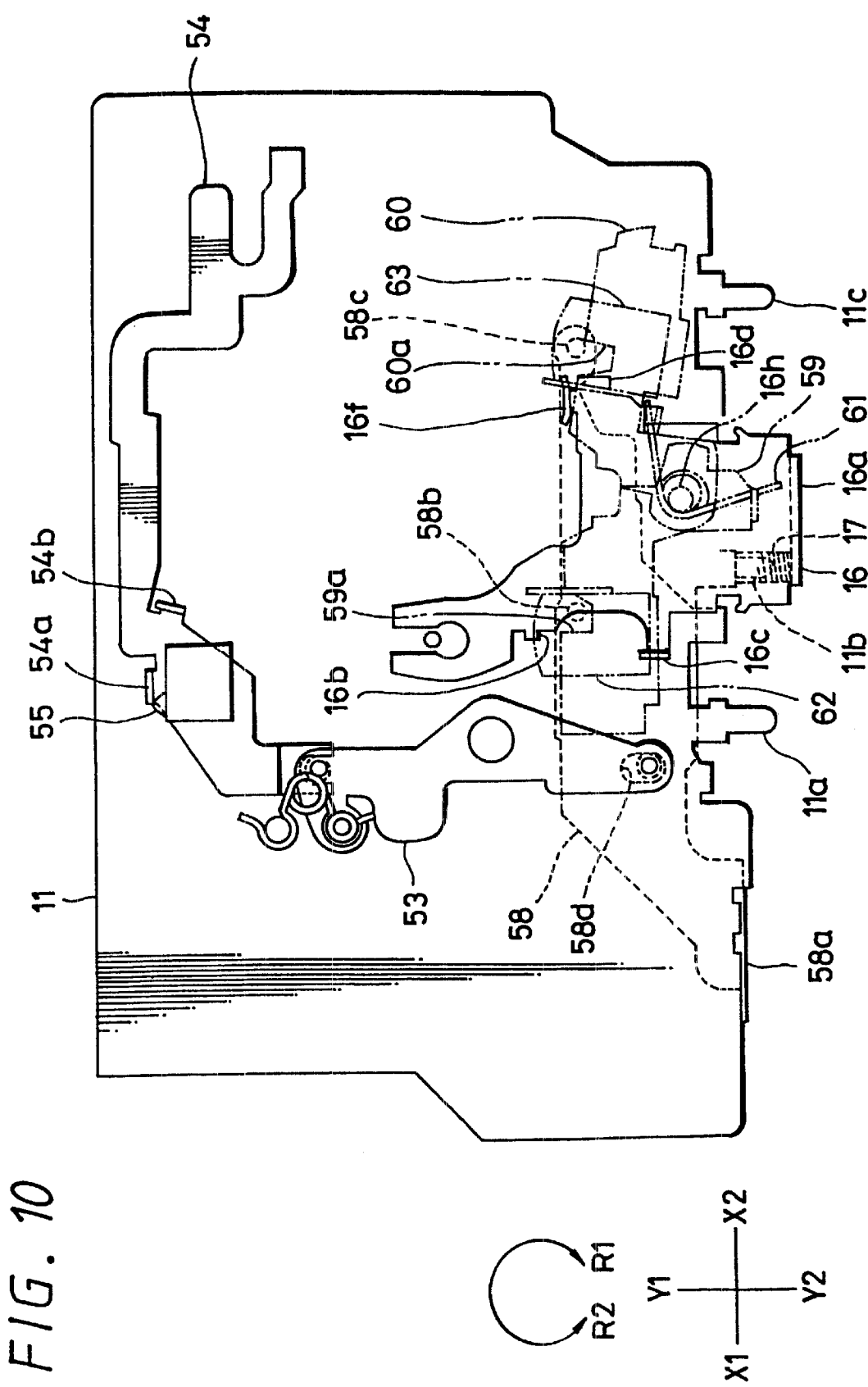
FIG. 10 is a schematic enlarged plan view of a magnetic tape driving mechanism, and illustrates the REV mode.

When the operator moves the tape running lever 16 in the Y2 direction, as shown in FIG. 10, the first base 59 and the second base 60 may be moved in the Y1 direction as the tape running lever 16 may be moved. The pinch roller 65 may be moved in the Y1 direction as the second base 60 is moved with the result that the pinch roller can be urged against the capstan shaft 15 through the magnetic tape.

When the first base 59 and the second base 60 are moved in the Y1 direction, since the head switching lever 58 is located at the second restricting position, one side edge of the second base 60 is brought in contact with the restricting protruded portion 58c of the head switching lever 58. On the other hand, since the restricting protruded portion 58b is located at the escape concave portion 59a of the first base 59, the first base may be rotated around the rotating supporting point 16h in the R1 direction under spring force of the torsion coil spring 61, whereby the first magnetic head 62 can be brought in contact with the magnetic tape.

As described above, as shown in FIGS. 9 and 10, the follower gear 40 and the reel holder gear 45 may be meshed together and the first magnetic head 62 may be brought in contact with the tape, whereby the cassette tape player can be set to the REV mode. In this mode, the magnetic tape may be supplied by the pinch roller 65 and the capstan shaft 15 and then rewound by the reel holder 66.

As described above, in the cassette tape recorder 1 according to the present invention, the first magnetic head 62 and the second magnetic head 63 can be switched by selectively rotating the first base 59 or the second base 60 around one rotation supporting point 16*h*.

Therefore, according to the above-mentioned arrangement, the operation of one base 59 (60) is not restricted by the other base 60 (59), and hence a satisfactory positional accuracy of the respective magnetic heads 62, 63 can be maintained. Since the cassette tape recorder needs only one rotation supporting point 16*h*, the cassette tape recorder has few assemblies. In addition, since the space in which the first base 59 and the second base 60 can be rotated can be made small, an interference of the first base and the second base with other members can be avoided easily, and hence a freedom required upon designing can be increased.

Next, the auto reverse operation (switching operation from the NOR mode to the REV mode or the switching operation from the N-REC mode to the R-REC mode) and the shut-off operation (automatic stop operation of the REV mode or the R-REC mode) of the cassette tape recorder 1 will be described with reference to FIGS. 11 to 16.

Figure 11:
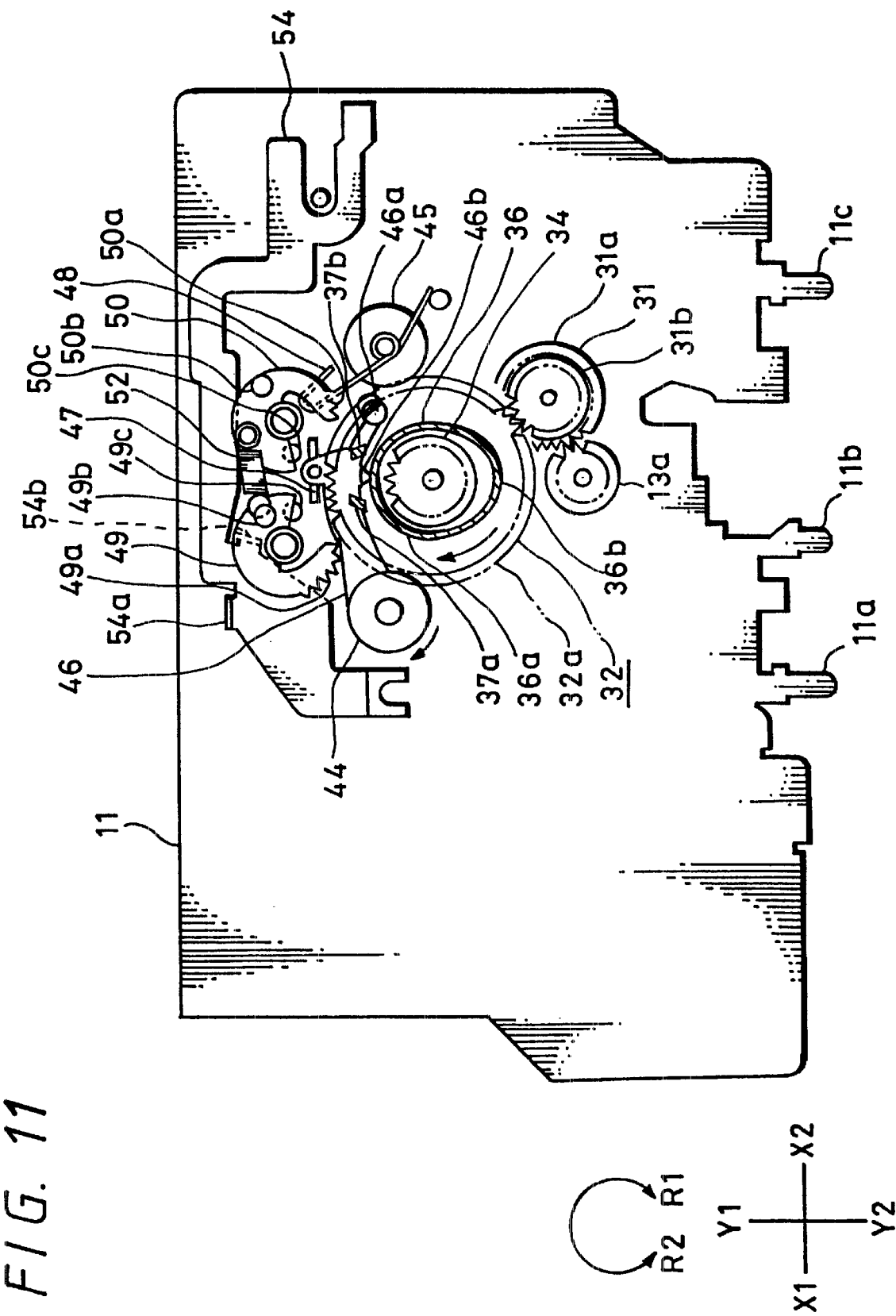
FIG. 11 shows an automatic reverse operation and a shut-off operation together with FIGS. 12 to 16, and is a schematic enlarged rear view showing the state in which a slide contact portion of a swing lever is brought in slidable contact with a slide cam portion as a reel holder gear is rotated.
Figure 12:
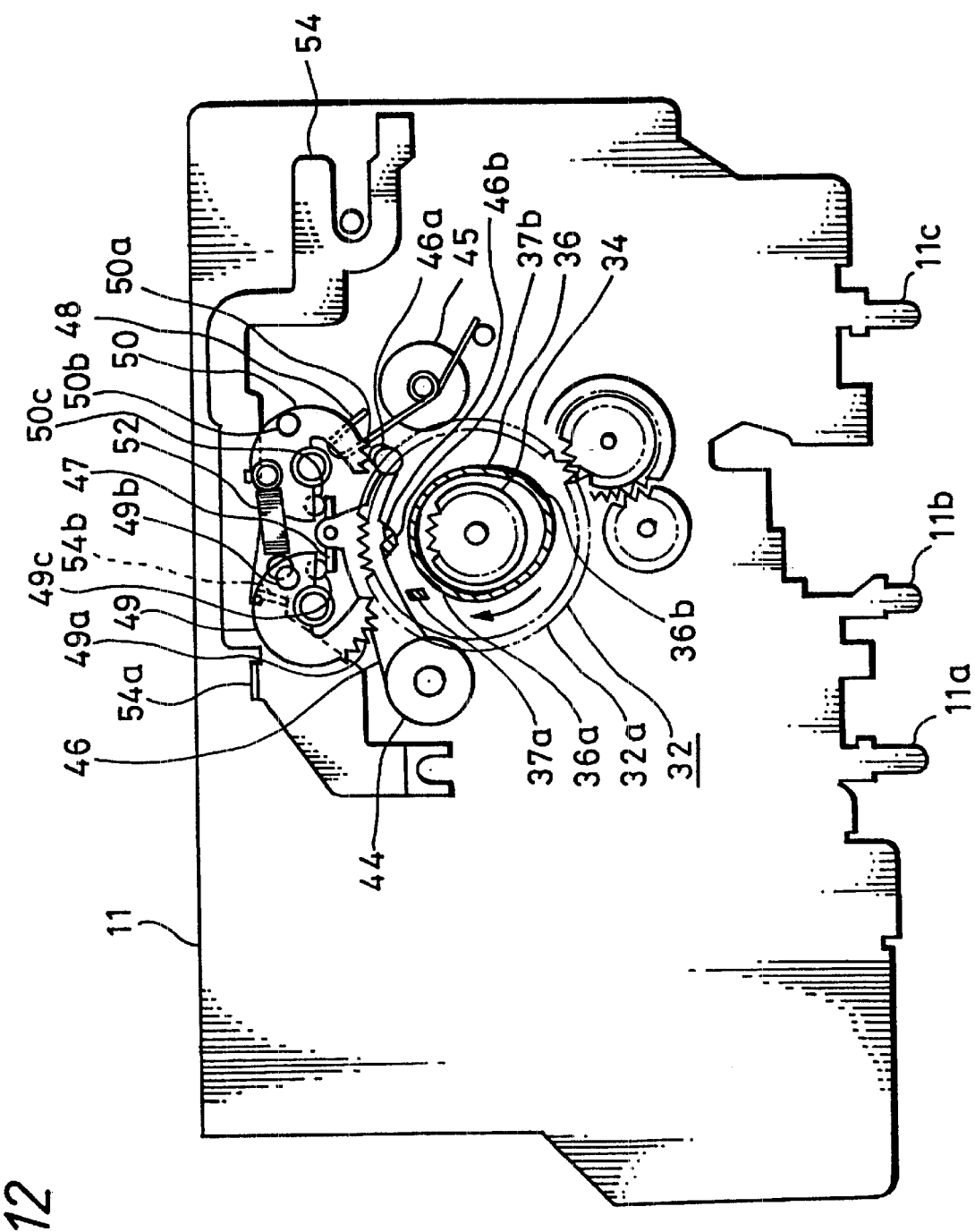
FIG. 12 is a schematic enlarged rear view showing the state in which the slide contact portion of the swing lever is engaged with a protruded cam portion after the reel holder gear was stopped.
Figure 13:
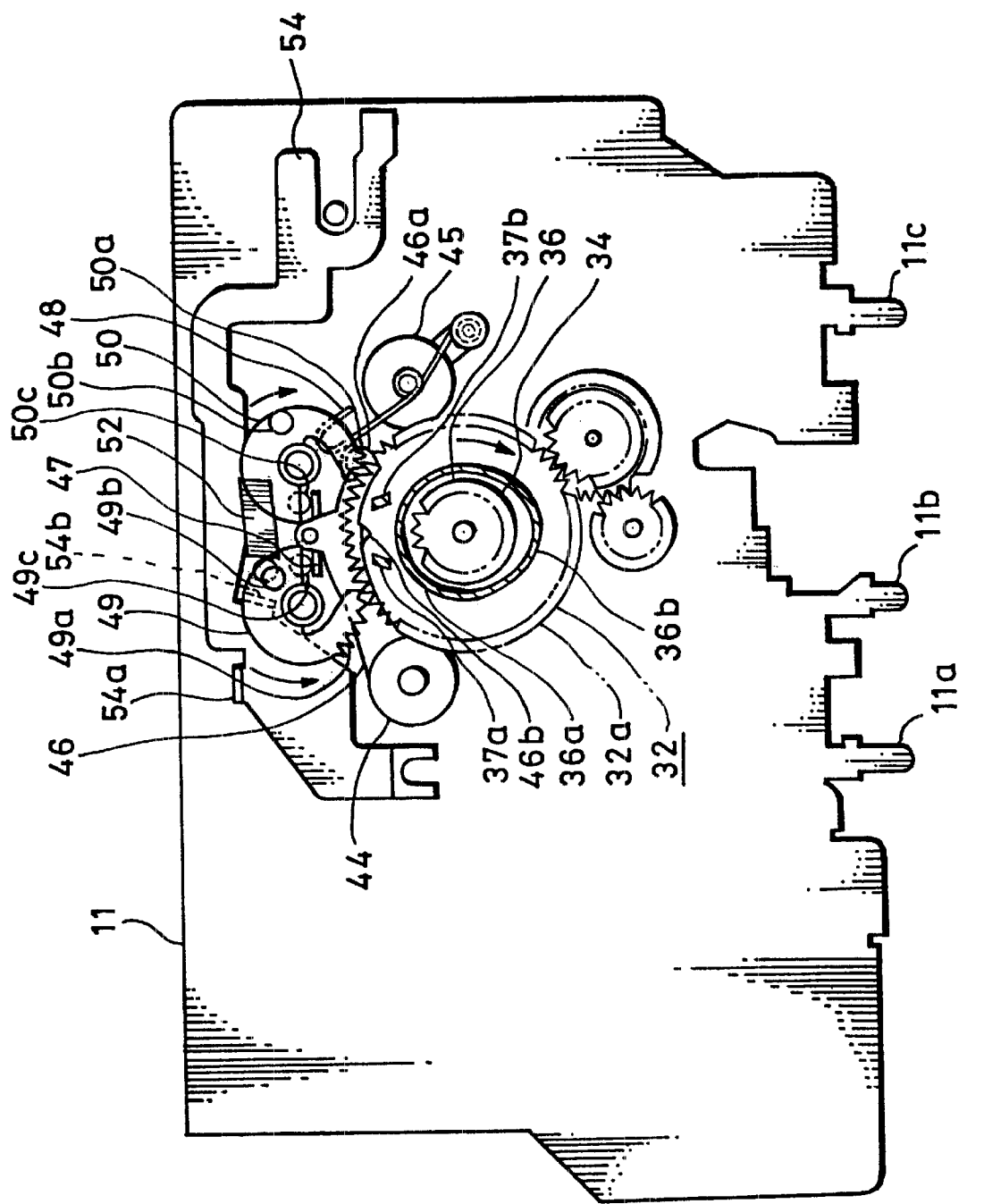
FIG. 13 is a schematic enlarged rear view showing the state in which a part of a running reversing gear and a part of a running stop gear are brought in contact with the cam member.
Figure 13:
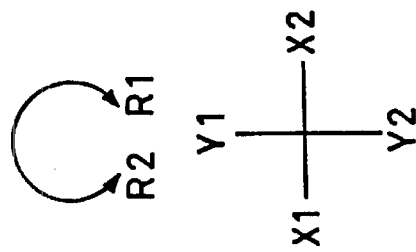
Figure 14:
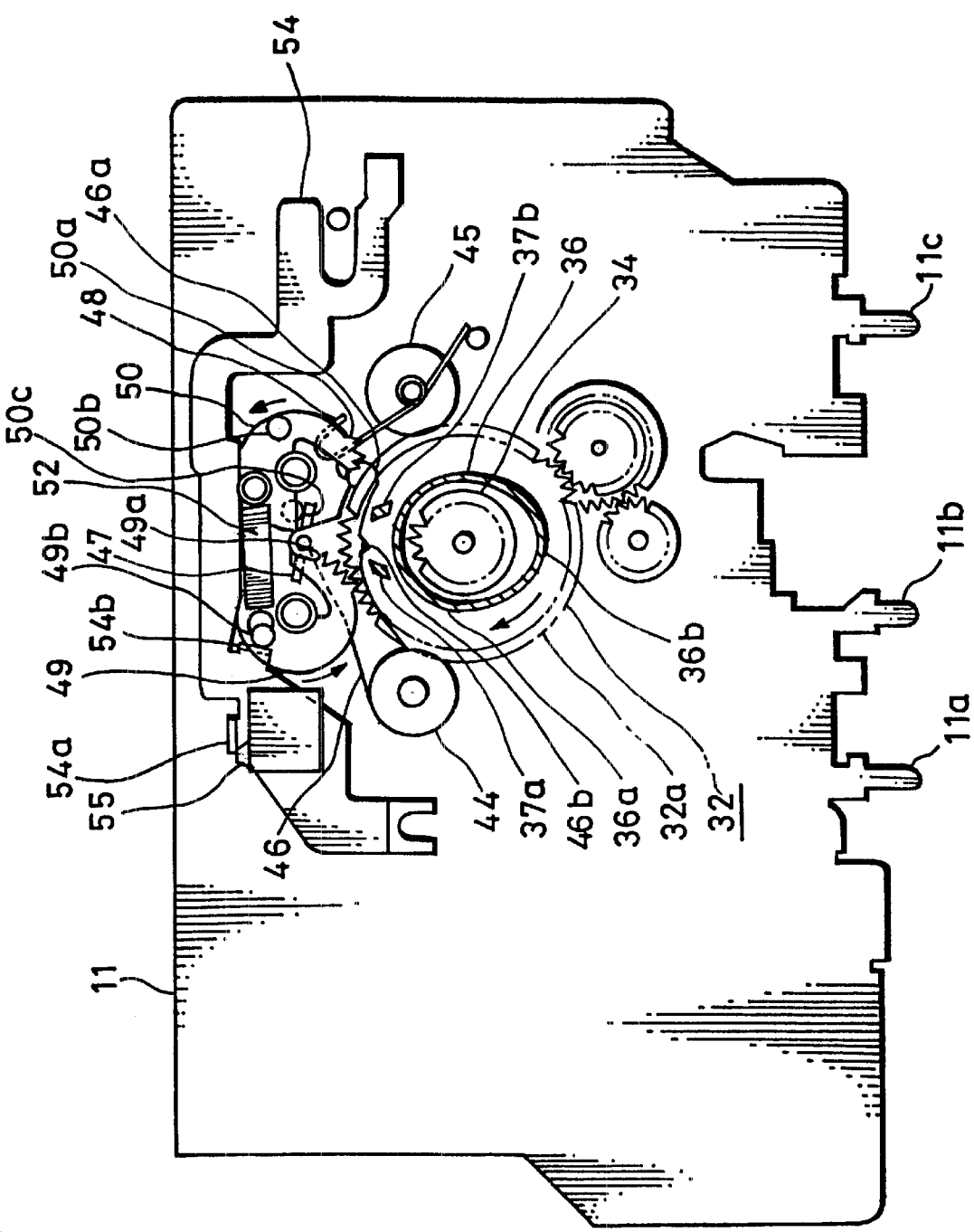
FIG. 14 is a schematic enlarged rear view showing the operated state of a running direction switching lever in which the running reversing gear is meshed with a gear portion of a cam member.

Under the condition that the cassette tape recorder is set to the NOR mode, the cam member 32 and the reel holder gear 44 are both rotated in the R1 direction as shown in FIG. 11. As the reel holder gear 44 is rotated in the R1 direction, the swing lever 46 is spring-biased in the R1 direction, whereby the slide contact portion 46*b* is brought in slidable contact with the slide contact cam member 36 of the cam member 32. Accordingly, when the slide contact portion 46*b* of the swing lever 46 is brought in contact with the portion 5 most distant from the rotation center in the displacement portion 36*b* of the slide contact cam portion 36, the swing lever may be placed at an engagement preparation position at which the swing lever can be engaged with the protruded cam portion 37*a* or the protruded cam portion 37*b*. When the slide contact portion 46*b* of the swing lever is brought in contact with the portion other than the portion most distant from the rotation center in the displacement portion 36*b* of the slide contact cam portion 36 or the arcuate portion 36*a*, the swing lever may be placed at a non-engagement position at which the swing lever cannot be engaged with the protruded cam portion 37*a* or the protruded cam portion 37*b*. At that very moment, the pressure plate 47 supported by the swing lever 46 is brought in contact with neither the pressed portion 49*c* of the running reversing gear 49 nor the pressed portion 50*c* of the running stop gear 50.

When the magnetic tape reaches its end and stops running, the rotation of the reel holder gear 44 is stopped and the rotation of the limiter gear 34 also is stopped. When the rotation of the reel holder gear 44 is stopped, the swing lever 46 is released from being spring-biased in the R1 direction. At that time, since the tape running lever 16 is still pressed and placed in the Y1 direction, the drive motor 12 is not stopped so that the cam member 32 is continuously rotated with respect to the limiter gear 34 in the R1 direction.

Figure 15:
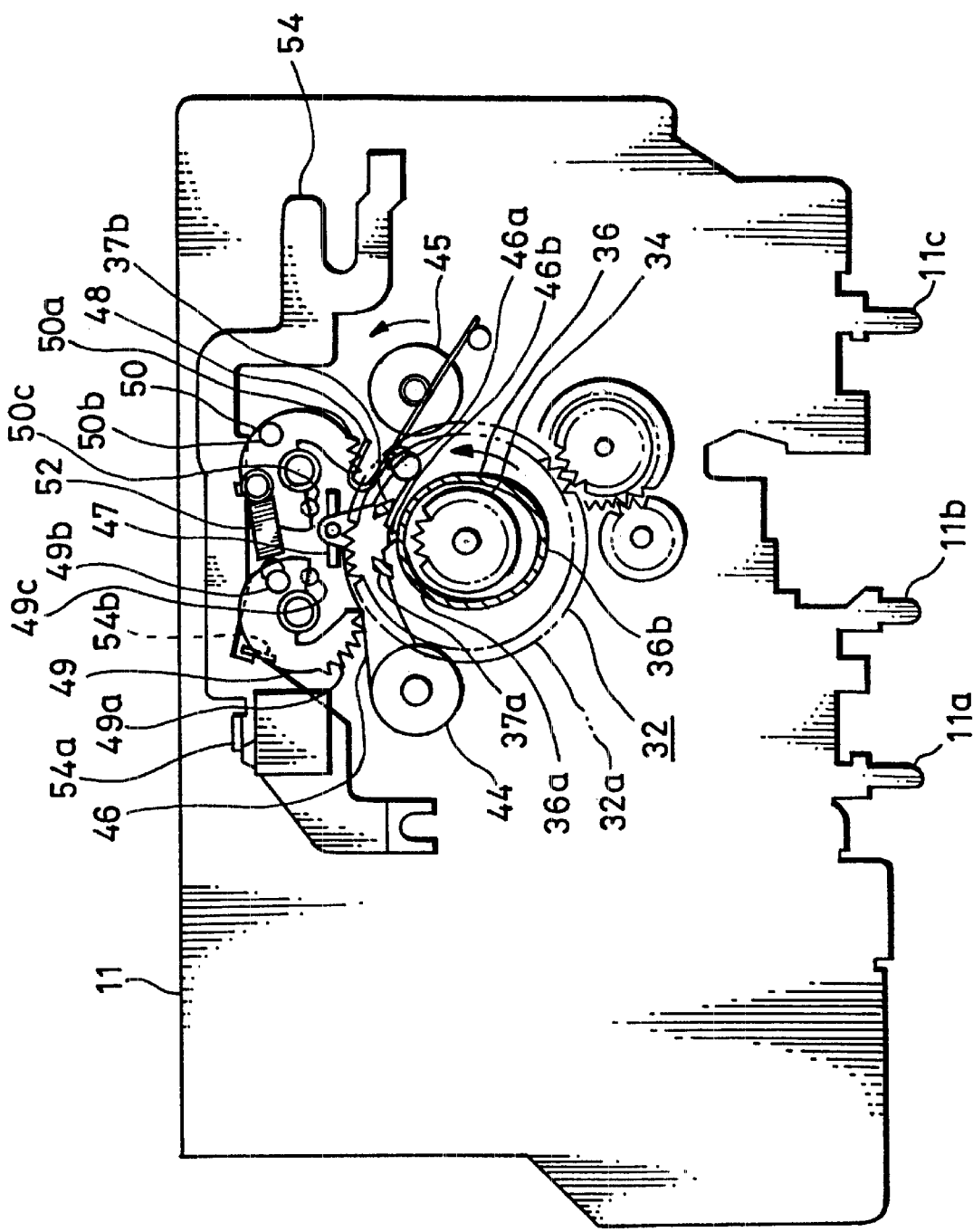
FIG. 15 is a schematic enlarged rear view showing the state in which the slide contact portion of the swing lever is brought in slidable contact with the slide contact cam portion under spring force of a spring-biasing spring.
Figure 15:
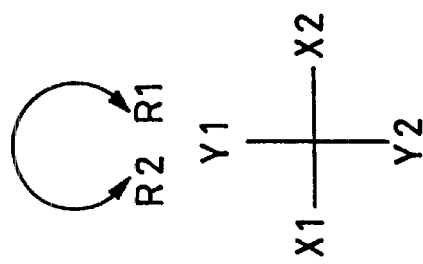

When the cam member is rotated in one direction, the cam member can be released from being meshed with the gear portion 32*a* (see FIG. 15). The oscillating lever 38 is rotated in the R2 direction in accordance with the direction in which the cam member 32 is rotated, whereby the follower gear 40 and the reel holder gear 45 are meshed with each other. As a consequence, since the reel holder gear 45 also is rotated in the R2 direction, the spring-biasing spring 48 supported by the reel holder gear 45 may be rotated in the R2 direction.

As described above, the automatic reverse operation may be executed and the cassette tape recorder may be set to the REV mode so that the magnetic tape can be transported in the reverse direction.

The spring-biasing spring 48, which was rotated in the R2 direction, may press the spring receiving portion 46*a* of the swing lever 46 thereby to permit the swing lever 46 to be spring-biased again in the R1 direction. Accordingly, as shown in FIG. 15, the slide contact portion 46*b* of the swing lever 46 is again brought in slidable contact with the slide contact cam portion 36 of the cam member 32.

When the magnetic tape reaches its end and stops running in the REV mode, the rotation of the reel holder gear 45 is stopped and the rotation of the limiter gear 34 also is stopped. When the rotation of the reel holder gear 44 is stopped, the swing lever 46 may be released from being spring-biased in the R1 direction by the spring-biasing spring 48. At that time, since the tape running lever 16 is still pressed and located in the Y1 direction, the drive motor 12 may not be stopped and the cam member 32 may be continuously rotated with respect to the limiter gear 34 in the R2 direction.

When the cam member 32 is rotated up to a predetermined position, the slide contact portion 46*b* of the swing lever 46 may be brought in slidable contact with the displacement portion 36*b* of the slide contact cam portion 36. When the cam member 32 is rotated continuously, since the swing lever 46 is released from being spring-biased in the R1 direction, the slide contact portion 46*b* remains at the engagement preparation position at which it is brought in slidable contact with the displacement portion 36*b* and thereby engaged with the protruded cam portion 37*a*.

Figure 16:
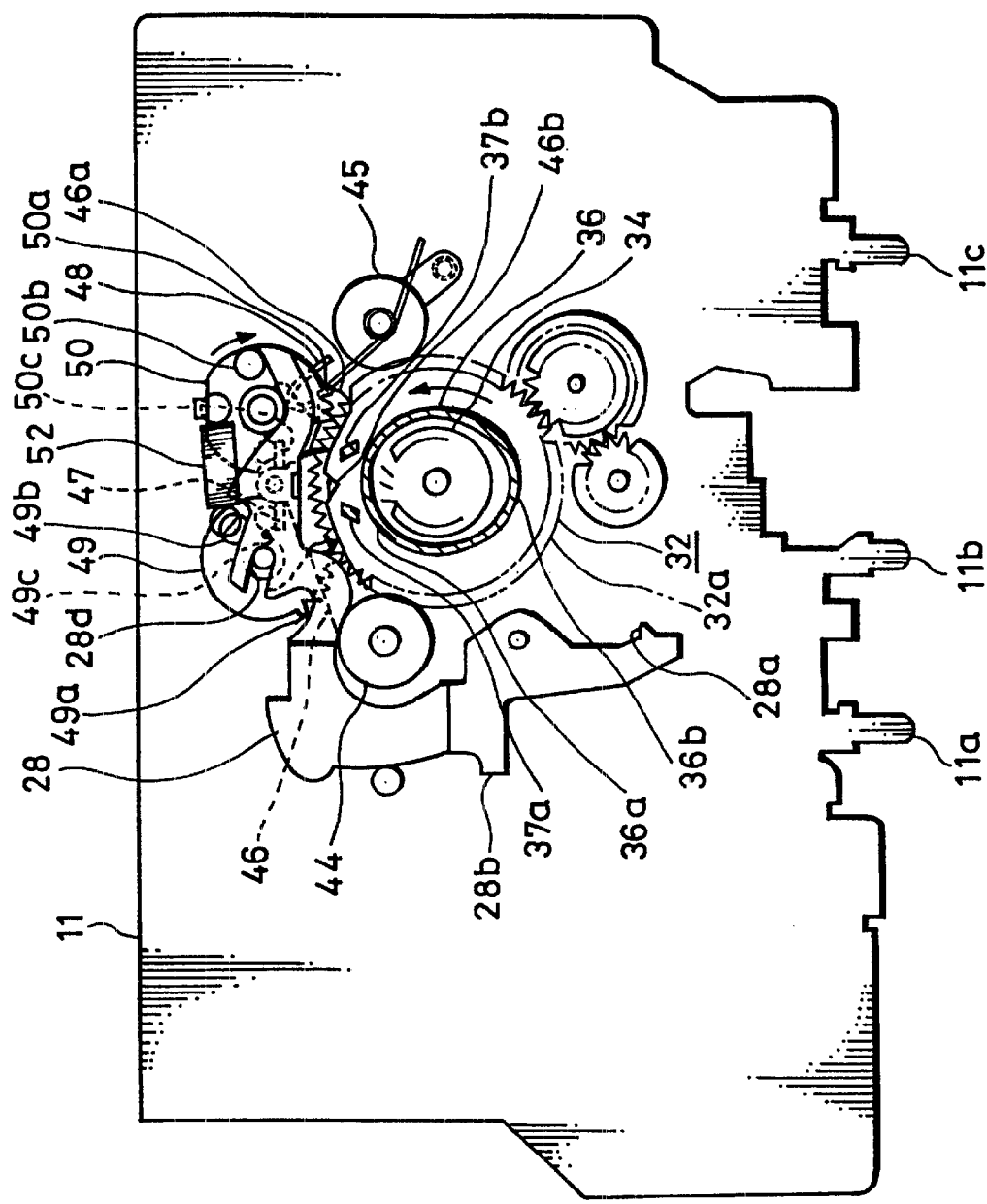
FIG. 16 is a schematic enlarged rear view showing the state in which a running stop lever is operated after the running stop gear was rotated.

The slide contact portion 46*b* is engaged with the protruded cam portion 37*a* and the cam member 32 is further rotated, whereby the swing lever 46 is rotated in the R2 direction and reached to the operation position to permit the pressure plate 47 to press the pressed portion 49*c* of the running reversing gear 49 and the pressed portion 50*c* of the running stop gear 50. Accordingly, the running reversing gear 49 may be rotated in the R2 direction and the running stop gear 50 may be rotated in the R1 direction so that the tips of the gear 49*a* and the gear 50*a* can be brought in contact with the gear portion 32*a* of the cam member 32 as shown in FIG. 16.

Although the gear 49*a* and the gear 50*a* are brought in contact with the gear portion 32*a* of the cam member 32, at that time, since the cam member 32 is rotated in the R2 direction, the gear portion 32*a* can be meshed with the gear 50*a* that can be meshed. Accordingly, although the running stop gear 50 is further rotated in the R1 direction, the running reversing gear 49 is rotated in the R1 direction by the action of the coil spring 52 extended between the running reversing gear 49 and the running stop gear 50, whereby the gear 49*a* may be separated from the gear portion 32*a* of the cam member 32. When the operation stop gear 50 is rotated in the R1 direction, the acting shaft 50*b* presses the tip portion of the running stop lever 28 to cause the running stop lever 28 to be rotated in the R1 direction, thereby resulting in the lock portion 28*a* and the locked portion 16*b* of the tape running lever 16 being disengaged from each other. Therefore, under spring force of the spring 17, the tape running lever 16 can be returned to the original position at which the tape running lever had been located before it is moved.

As described above, the shut-off operation may be carried out, and the cassette tape recorder is placed in the STOP mode in which mode the running of the tape can be stopped.

Incidentally, since the automatic reverse operation in which the cassette tape recorder is set from the N-REC mode to the R-REC mode differs from the above-mentioned operation only in that the recording lever 20 is operated together with the tape running lever 16, this automatic reverse operation can be executed similarly as described above. Since the shut-off operation in which the cassette tape recorder is set from the R-REC mode to the STOP mode also differs from the above-mentioned operation only in that the recording lever 20 is operated together with the tape running lever 16 in the R-REC mode, this shut-off operation can be executed similarly as described above.

As set forth above, in the cassette tape recorder 1 according to the present invention, since the mode is switched by changing the position of the swing lever 46, the switching mechanism a is not complex in arrangement, and the reliable operating state can be maintained by a few assemblies.

When the magnetic tape is transported in the reverse direction, since the swing lever 46 is spring-biased by the spring-biasing spring 48 in the direction in which the slide contact portion 46b approaches the slide contact cam portion 36 of the cam member 32, the cassette tape recorder can be operated properly when the magnetic tape is transported in the reverse direction and the cassette tape recorder can be operated properly when the shut-off operation is executed.

Further, since the spring-biasing spring 48 is rotated as the reel holder gear 45 is rotated, the cassette tape recorder can be maintained in the proper operating state when the magnetic tape is transported in the reverse direction.

In addition, since the cassette tape recorder 1 includes the running reversing gear 49 and the running stop gear 50 which are selectively meshed with the gear portion 32a of the cam member 32 in accordance with the rotating direction of the cam member 32 when the swing lever 46 is rotated up to the operation position, the automatic switching of the running direction of the magnetic tape and the automatic stop of the running of the magnetic tape can be executed properly by a few assemblies.

Incidentally, while the tape cassette recorder automatically switches the tape running direction, i.e. the tape cassette recorder is automatically set to the REV mode from the NOR mode or to the R-REC mode from the N-REC mode when the magnetic tape reaches its end according to the above-mentioned arrangement, the cassette tape recorder 1 according to the present invention can switch the NOR mode and the REV mode with each other by manually operating the running direction switching lever 54.

When the operator switches the NOR mode and the REV mode manually, as described above, the operator can set the cassette tape recorder to the REV mode by operating the direction operation portion 10 to move the running direction switching lever 54 in the X1 direction in the NOR mode as shown in FIG. 9. Moreover, the operator can set the cassette tape recorder to the NOR by moving the running direction switching lever 54 in the X2 direction in the REV mode as shown in FIG. 7.

Therefore, in the cassette tape recorder 1 according to the present invention, as described above, since the first magnetic head 62 and the second magnetic head 63 can be properly switched, the running direction of the magnetic tape can be automatically switched by the automatic reverse operation and the operator can switch the running direction of the magnetic tape in a manual fashion by operating the direction operation portion 10, the cassette tape recorder according to the present invention can be made more convenient and the operability thereof can be improved.

In the cassette tape recorder 1 according to the present invention, as described above, while the operator can switch the NOR mode and the REV mode each other in a manual fashion, the operator may be inhibited from switching the N-REC mode and the R-REC mode each other in a manual fashion in the REC mode.

A switching preventing mechanism for preventing the operator from switching the N-REC mode and the R-REC mode in a manual fashion will be described below with reference to FIGS. 17 to 21.

Figure 18:
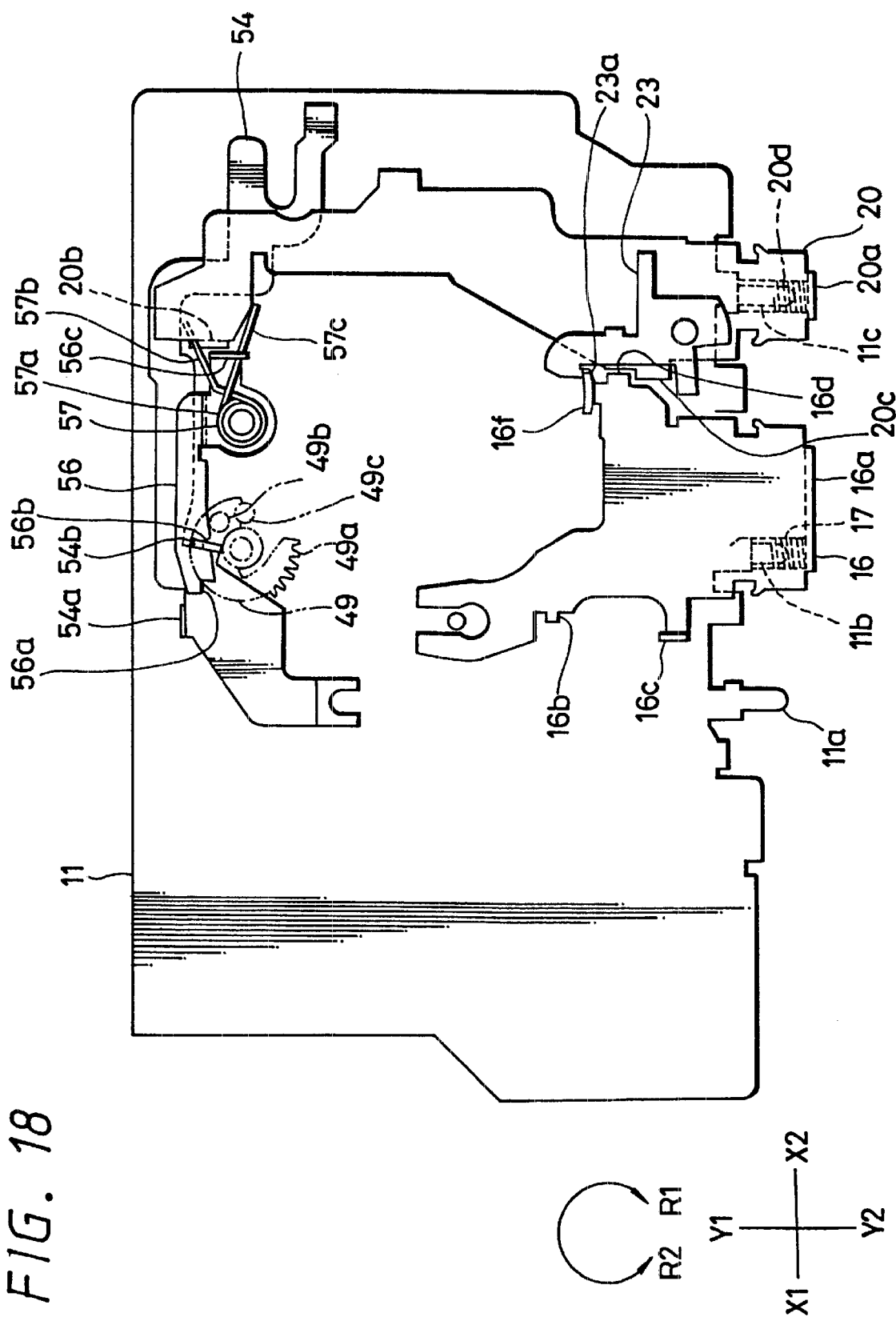
FIG. 18 is a schematic enlarged rear view showing the state in which a running direction switching lever is restricted by a movement restricting lever in the N-REC mode.
Figure 19:
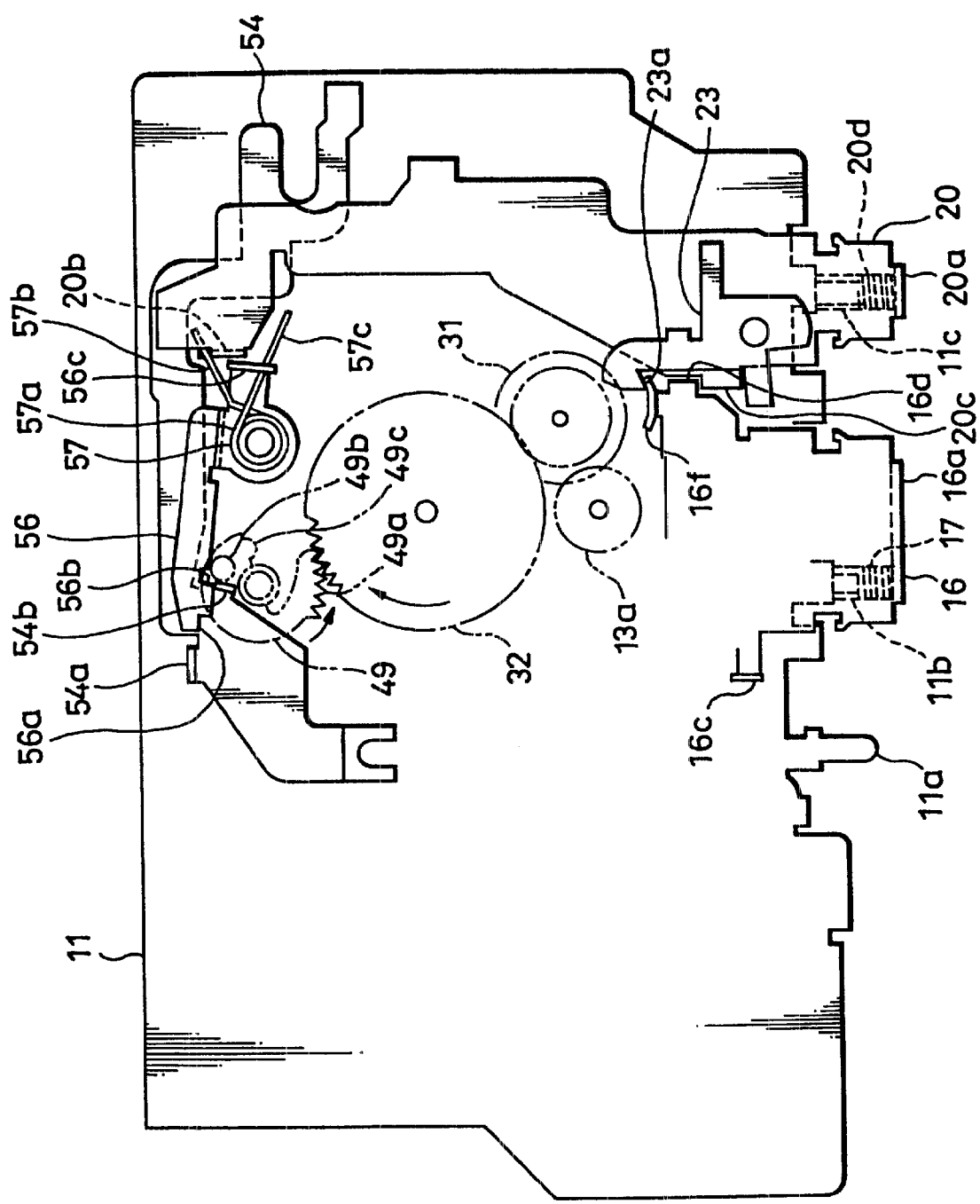
FIG. 19 is a schematic enlarged rear view showing the state in which the restriction imposed upon the running direction switching lever by the movement restricting lever is temporarily released by a running reversing gear.
Figure 21:
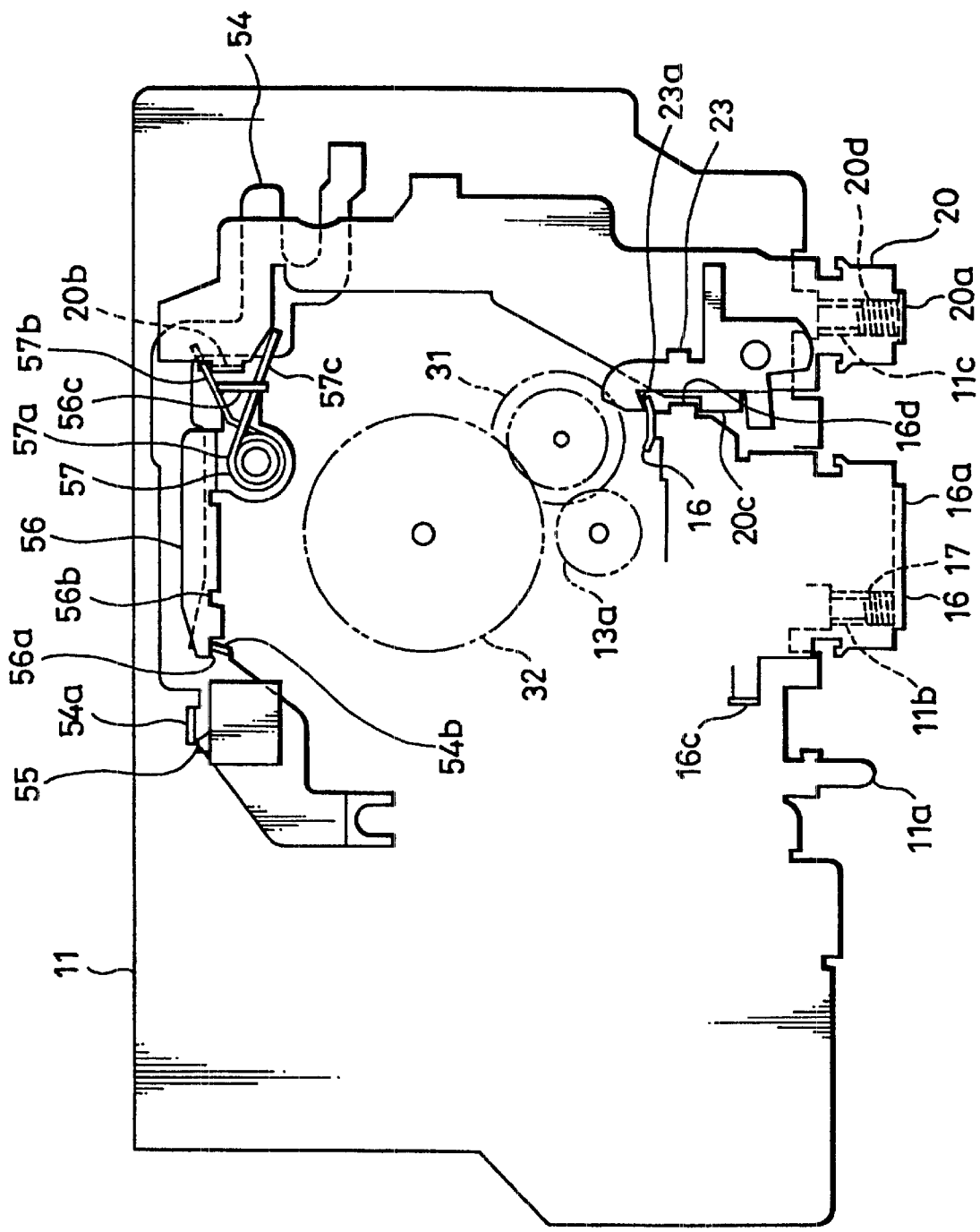
FIG. 21 is a schematic enlarged rear view showing the state in which the running direction switching lever is restricted by the movement restricting lever in the R-REC mode.

Initially, the manner in which the cassette tape recorder is switched from the STOP mode to the N-REC mode will be described with reference to FIGS. 17 and 18.

In the STOP mode, under the condition that the head switching lever 58 is located at the first restricting position which is the position on the side of the X1 direction, when the operator moves the recording lever 20 in the Y1 direction, the pressure portion 20c is pressing the pressed portion 16d of the tape running lever 16, whereby the tape running lever 16 is progressively moved in the Y1 direction as the recording lever 20 is moved. When the tape running lever 16 is moved up to the predetermined position, as described above, the tape running lever 16 is locked by the running stop lever 28.

At the same time, when the recording lever 20 is being moved in the Y1 direction, as shown in FIG. 17, the lock member 23 may be rotated in the R2 direction by an action of a torsion coil spring, not shown, whereby the engagement portion 23a may be engaged with and thereby locked to the lock portion 16f of the tape running lever 16. Therefore, the recording lever 20 can be locked through the tape running lever 16 and the lock member 23 to the running stop lever 28, thereby resulting in the tape cassette recorder being set to the N-REC mode.

Under the condition that the recording lever 20 is moved in the Y1 direction and then locked, the spring engagement portion 20b of the recording lever 20 displaces the resilient contact portion 57b of the torsion coil spring 57 engaged with the spring engagement portion 20b in the Y1 direction. As a result, the movement restricting lever 56 with which the resilient contact portion 57b is engaged by the action of the torsion coil spring 57 is rotated in the R2 direction, whereby the second restricting edge 56b of the movement restricting lever 56 is engaged with the acted portion 54b of the running direction switching lever 54 (see FIG. 18). Therefore, the running direction switching lever 54 is restricted from being moved in the X1–X2 direction so that, even when the operator intends to operate the head switching lever 58 in a manual fashion in the N-REC mode, the operator cannot operate the head switching lever 58 coupled through the intermediate lever 53 to the running direction switching lever 54.

Incidentally, in the automatic reverse operation, in order to switch the running direction of the magnetic tape, the operator has to move the running direction switching lever 54 in the X1 direction when the tape reaches its end. However, as described above, when the tape reaches its end in the NOR mode and the N-REC mode, the running reversing gear 49 may be rotated in the R2 direction. Therefore, in the NOR mode and the N-REC mode, as the running reversing gear 49 is rotated, the acting shaft 49b presses the side edge portion of the movement restricting lever 56 in such a fashion that the movement restricting lever 56 may be rotated in the R1 direction. As a consequence, the second restricting edge 56b and the acted portion 54b can be disengaged from each other temporarily, thereby enabling the running direction switching lever 54 to be moved in the X1 direction (see FIG. 19). When the running direction switching lever 54 is moved in the X1 direction and the switching lever 55 is operated by the switch member 54a, the rotation direction of the drive motor 12 may be reversed and the cam member 32 and the reel holder gear 45 may be rotated in the R2 direction, thereby resulting in the cassette tape recorder being set to the R-REC mode (see FIG. 20).

In the R-REC mode, since the running reversing gear 49 is rotated in the R1 direction and returned to the state in which it had been placed before it is rotated in the R2 direction, the acting shaft 49b may be released from pressing the side edge portion of the movement restricting lever 56. The movement restricting lever 56 may be again rotated in the R2 direction by the action of the torsion coil spring 57. At that very moment, since the running direction switching lever 54 is moved in the X1 direction, the first restricting edge 56a may be engaged with the acted portion 54b of the running direction switching lever 54 (see FIGS. 20 and 21).

Therefore, the running direction switching lever 54 is restricted from being moved in the X1–X2 direction so that, even when the operator intends to move the head switching lever 58 in a manual fashion by operating the direction operation portion 10 in the R-REC mode, the operator is unable to move the head switching lever 58 coupled through the intermediate lever 53 to the running direction switching lever 54.

As described above, since the cassette tape recorder 1 restricts the movement of the running direction switching lever 54 by the movement restricting lever 56 which is operated in unison with the operation of the lever 20 to thereby inhibit the running direction of the magnetic tape from being switched manually in the REC mode, the number of assemblies can be decreased considerably and the mechanism can be simplified. At the same time, a satisfactory assembly property in the manufacturing process can be maintained.

When the magnetic tape reaches its end, since the restriction exerted upon the running direction switching lever 54 from the movement restricting lever 56 is released temporarily, an interference can be prevented from occurring in the automatic reverse operation for automatically switching the running direction of the magnetic tape.

Since the acting shaft 49b used to release the running direction switching lever 54 from being restricted by the movement restricting lever 56 may be formed on the running reversing gear 49 which moves the running direction switching lever 54 in the X1 direction in the automatic reverse operation, the switching preventing mechanism according to the present invention has two functions of a function to enable the running reversing gear 49 to move the running direction switching lever 54 and a function to release the restriction of the movement restricting lever 56, the members having the respective functions need not be provided separately, and therefore the switching preventing mechanism can be simplified much more by the reduction of the number of assemblies.

Next, the CUE mode and the REVIEW mode will be described with reference to FIGS. 23 and 24.

Figure 22:
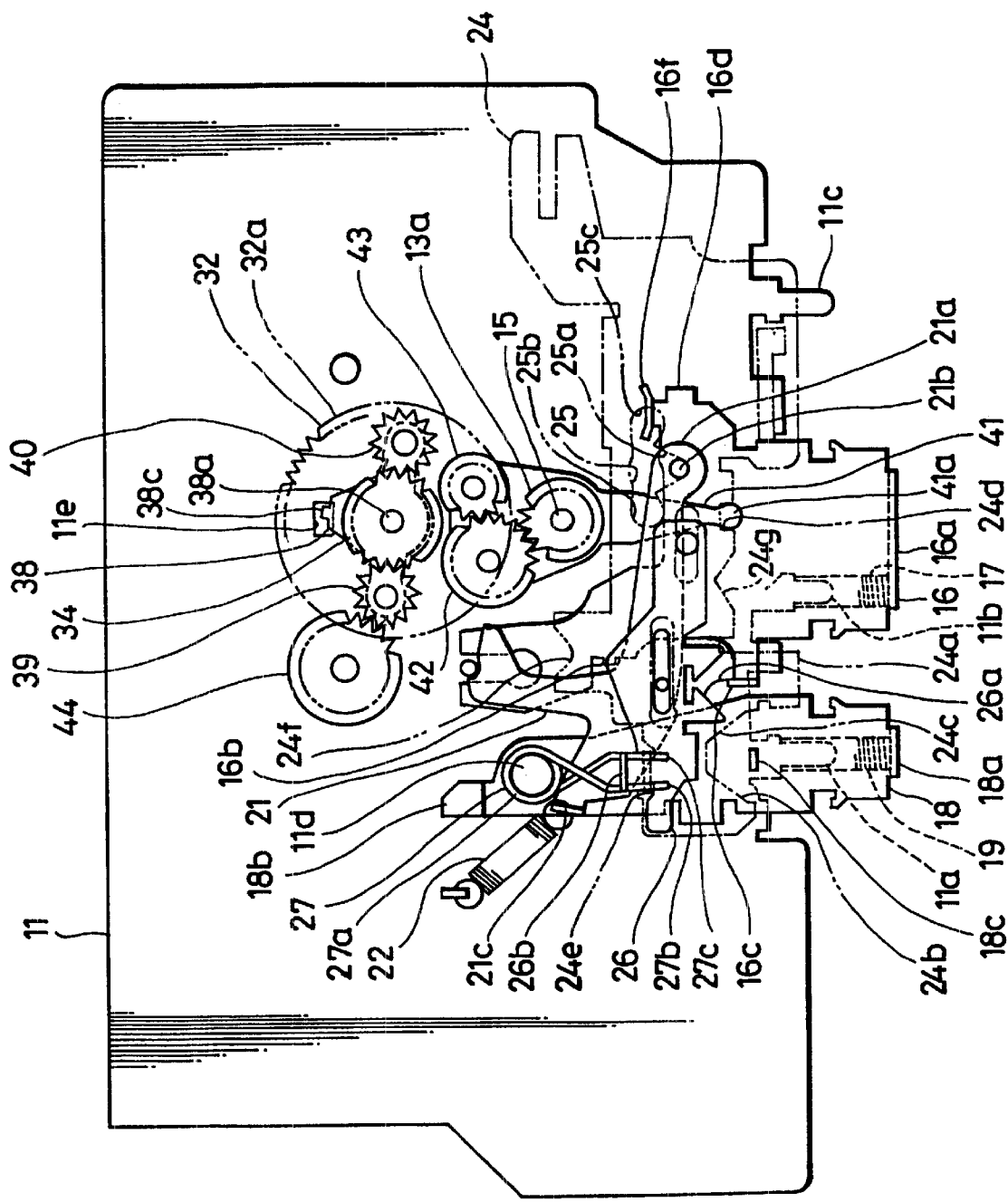
FIG. 22 is a schematic enlarged rear view showing a positional relationship between an FR lever and a retained member in the STOP mode.
Figure 22:
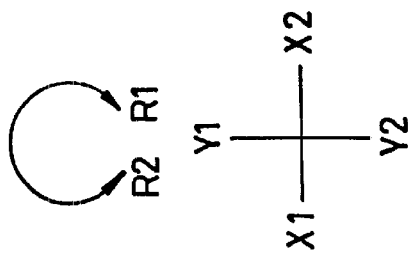

As described above, in the STOP mode, the FR lever 24 is located at the center position, accordingly, the rotating lever 41 is located at nearly the center in the rotation direction so that neither the first gear 42 nor the second gear 43 may be meshed with the limiter gear 34 as shown in FIG. 22. In the STOP mode, as shown in FIG. 22, the spring engagement portion 26b of the retained member 26 is located close to the spring engagement portion 24e of the FR lever 24 located at the center position in the Y direction, and the resilient contact portions 27b, 27c of the return spring 27 may sandwich the spring engagement portion 24e and the spring engagement portion 26b under the condition that the resilient contact portions are intersected with each other.

Under the condition that the cassette tape recorder is set to the NOR mode or the REV mode from the STOP mode, since the FR lever 24 and the retained member 26 are not moved, there can be held the above-mentioned state in which the resilient contact portions 27b, 27c of the return spring 27 sandwich the spring engagement portion 24e and the spring engagement portion 26b under the condition that the resilient contact portions are intersected with each other (see FIGS. 7 and 9). In the states of the NOR mode and the REV mode, the restricting portion 16c of the tape running lever 16 is engaged with the restricted edge 26a of the retained member 26, thereby restricting the movement of the retained member 26 in the X1–X2 direction (see FIGS. 7 and 9). Further, in the NOR mode and the REV mode, the acted member 64b of the supporting member 64 is engaged with the center portion of the acting edge 24g of the FR lever 24 (see FIGS. 7 and 9).

Figure 23:
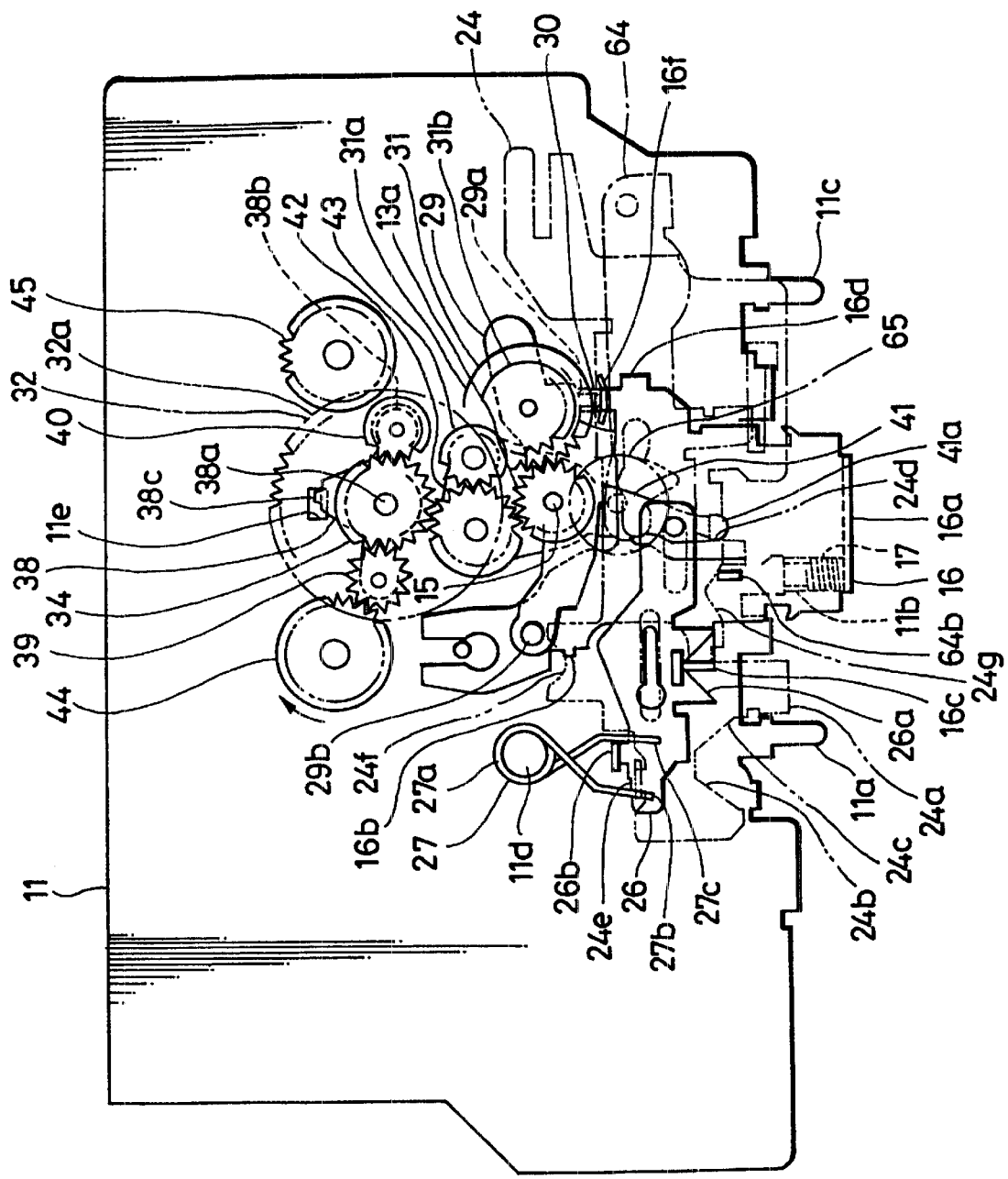
FIG. 23 is a schematic enlarged rear view showing the state in which the cassette tape recorder is set to the CUE mode from the NOR mode.

In the NOR mode, as shown in FIG. 23, when the operator moves the FR lever 24 in the X1 direction by using the FR operation portion 9, the cassette tape recorder may be set to the CUE mode. Incidentally, in the NOR mode, the small diameter portion 31b of the transmission gear 31 and the gear portion 32a of the cam member 32 are meshed with each other and the follower gear 39 and the reel holder gear 44 are meshed with each other, whereby the reel holder gear 44 may be rotated in the R1 direction (see FIG. 7).

When the FR lever 24 is moved in the X1 direction in the NOR mode, since the supported portion 41a of the rotating lever 41 is engaged with the supporting portion 24d as shown in FIG. 23, the rotating lever 41 is rotated in the R1 direction, whereby the first gear 42 is meshed with the limiter gear 34. At the same time, when the slide contact acting portion 24f is moved in accordance with the movement of the FR lever 24, the acted protruded portion 29b is moved in the Y1 direction to cause the drive force transmission lever 29 to be rotated in the R1 direction, whereby the small diameter portion 31b of the transmission gear 31 and the gear portion 32a of the cam member 32 may be released from being meshed with each other. Incidentally, under the condition that the first gear 42 is meshed with the limiter gear 34, based on a relationship of the number of gear teeth from the gear portion 13a of the flywheel 13 to the limiter gear 34, the rotation direction of the limiter gear 34 is not changed so that the meshed state of the follower gear 39 and the reel holder gear 44 can be maintained.

As the FR lever 24 is moved in the X1 direction, the acted member 64b of the supporting member 64 is brought in slidable contact with the acting edge 24g to permit the supporting member 64 to be rotated in the R1 direction, whereby the pinch roller 65 may be separated from the capstan shaft 15.

As described above, since the first gear 42 is meshed with the limiter gear 34, the transmission gear 31 and the cam member 32 are released from being meshed with each other and the pinch roller 65 is separated from the capstan shaft 15, the cassette tape recorder is set to the CUE mode presented when the magnetic tape is transported in the positive direction (see FIG. 23). In the CUE mode, on the basis of a relationship of each gear ratio, the reel holder gear 44 is rotated at a high speed, and the cassette tape recorder may execute a so-called CUE operation which is the fast-forwarding operation in the reproduction state presented when the magnetic tape is transported in the positive direction.

While the FR lever 24 is moved in the X1 direction and located at the first position in the CUE mode, since the retained member 26 is restricted from being moved by the restricting portion 16c of the tape running lever 16 and is thereby located at the acting position, the resilient contact portion 27b of the return spring 27 may be displaced in the X1 direction in accordance with the movement of the spring engagement portion 24e, whereby the FR lever 24 may be spring-biased in the X2 direction (see FIG. 23). Accordingly, when the operation of the FR lever 24 is released, the FR lever 24 may be moved in the X2 direction under spring force of the return spring 27 and thereby returned to the center position, thereby setting the cassette tape recorder in the NOR mode again (see FIG. 7). Incidentally, the FR lever 24 is returned to the center position, whereby the supporting member 64 is returned to the R1 direction by the action of the torsion coil spring 64a to permit the pinch roller 65 to be urged against the capstan shaft 15.

In the NOR mode, when the FR lever 24 is moved in the X2 direction, the cassette tape recorder is set to the REVIEW mode (see FIG. 24).

In the NOR mode, when the operator moves the FR lever 24 in the X2 direction by using the FR operation portion 9, the rotating lever 41 may be rotated in the R2 direction, whereby the second gear 43 may be meshed with the limiter gear 34 (see FIG. 24). At the same time, when the slide contact action portion 24f is moved as the FR lever 24 is moved, the drive power transmission lever 29 is rotated in the R1 direction to release the small diameter portion 31b of the transmission gear 31 and the gear portion 32a of the cam member 32 from being meshed with each other. Under the condition that the second gear 43 is meshed with the limiter gear 34, from a relationship of the number of gear teeth from the gear portion 13a of the flywheel 13 to the limiter gear 34, the rotation direction of the limiter gear 34 is changed and the oscillating gear 38 is rotated in the R2 direction, whereby the follower gear 39 and the reel holder gear 44 are released from being meshed with each other and the follower gear 40 and the reel holder gear 45 are meshed with each other.

As the FR lever 24 is moved in the X2 direction, the acted piece 64b of the supporting member 64 is slidably contacted with the action edge 24g and the supporting member 64 is rotated in the R1 direction, whereby the pinch roller 65 is separated from the capstan shaft 15.

As described above, since the second gear 43 is meshed with the limiter gear 34, the transmission gear 31 and the cam member 32 are released from being meshed with each other, the follower gear 40 and the reel holder gear 45 are meshed with each other and the pinch roller 65 is separated from the capstan shaft 15, the cassette tape recorder may be set to the REVIEW mode presented when the magnetic tape is transported in the positive direction (see FIG. 24). In the REVIEW mode, on the basis of each gear ratio, the reel holder gear 45 is rotated at a high speed, and the cassette tape recorder may be set to the so-called REVIEW operation which is the rewind operation in the reproduction mode obtained when the magnetic tape is transported in the positive direction.

While the FR lever 24 is moved in the X2 direction and located at the second position in the REVIEW mode, since the retained member 26 is restricted from being moved by the restricting portion 16c of the tape running lever 16 and located at the acting position, the resilient contact portion 27c of the return spring 27 is displaced in the X2 direction as the spring engagement portion 24e is moved, whereby the FR lever 24 is spring-biased in the X1 direction (see FIG. 24). Accordingly, when the operation of the FR lever 24 is released, the FR lever 24 is moved in the X1 direction and returned to the center position under spring force of the return spring 27, thereby setting the cassette tape recorder to the NOR mode again (see FIG. 7). Incidentally, the FR lever 24 is returned to the center position, whereby the pinch roller 65 is urged against the capstan shaft 15.

The manner in which the cassette tape recorder is set from the REV mode to the CUE mode or the REVIEW mode will be described next with reference to FIGS. 25 and 26.

Figure 25:
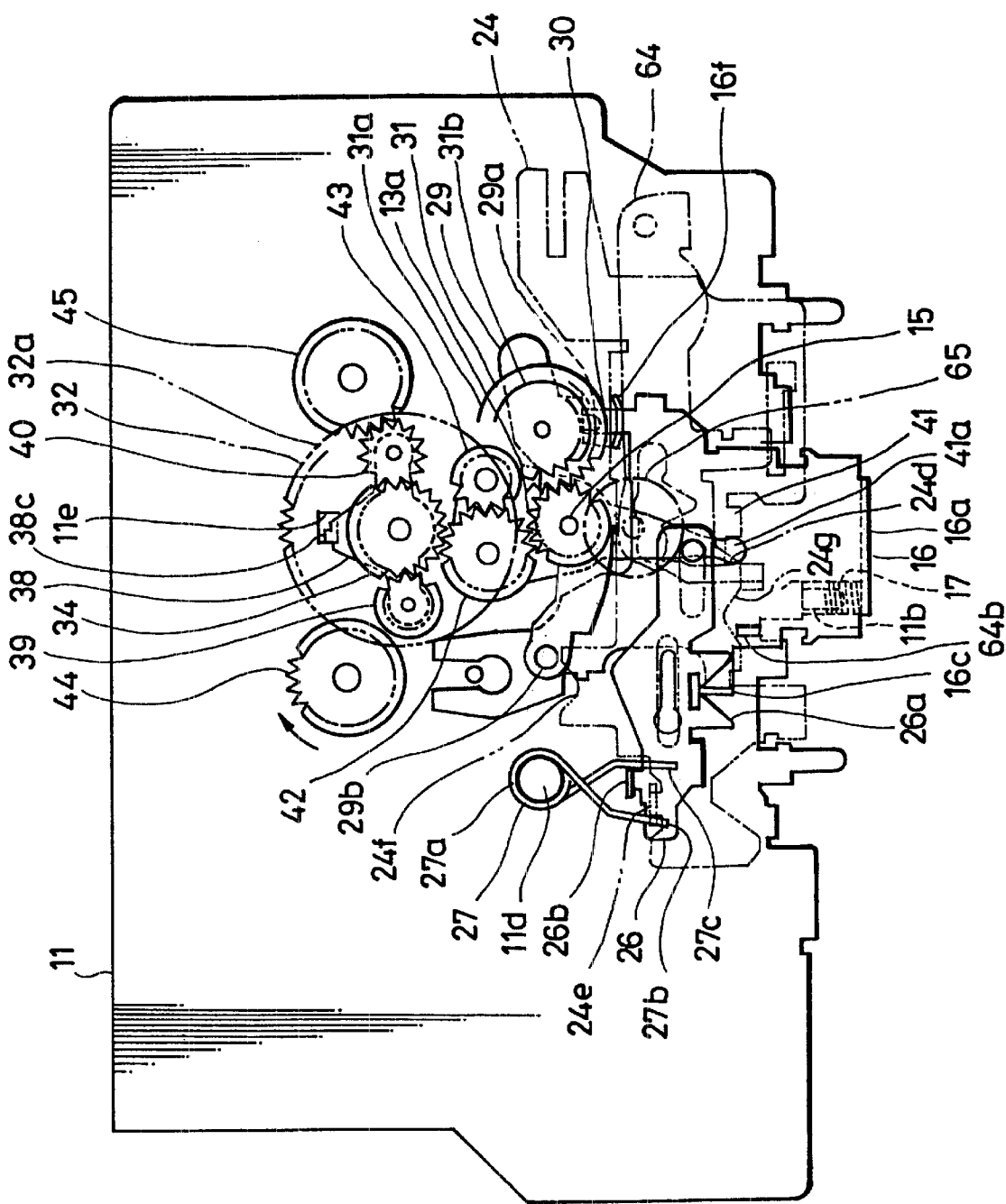
FIG. 25 is a schematic enlarged rear view showing the state in which the cassette tape recorder is set to the CUE mode from the REV mode.

In the REV mode, when the FR lever 24 is moved in the X1 direction as shown in FIG. 25, the cassette tape recorder is set to the CUE mode. Incidentally, in the REV mode, the small diameter portion 31b of the transmission gear 31 and the gear portion 32a of the cam member 32 are meshed with each other and the follower gear 40 and the reel holder gear 45 are meshed with each other, thereby resulting in the reel holder gear 45 being rotated in the R2 direction (see FIG. 9).

In the REV mode, when the FR lever 24 is moved in the X1 direction, the rotating lever 41 is rotated in the R1 direction and the first gear 42 is meshed with the limiter gear 34 (see FIG. 25). At the same time, the drive power transmission lever 29 is rotated in the R1 direction since the slide contact action portion 24f is moved as the FR lever 24 is moved, and the small diameter portion 31b of the transmission gear 31 and the gear portion 32a of the cam member 32 are released from being meshed with each other. In the state in which the first gear 42 is meshed with the limiter gear 34, on the basis of the relationship of the gear teeth from the gear portion 13a of the flywheel 13 to the limiter gear 34, the rotating direction of the limiter gear 34 is not changed and the meshed state of the follower gear 40 and the reel holder gear 45 can be maintained.

When the operator operates the FR operation portion 9 in a manual fashion, the acted member 64b of the supporting member 64 is brought in slidable contact with the acting edge 24g as the FR lever 24 is moved in the X1 direction to permit the supporting member 64 to be rotated in the R1 direction, whereby the pinch roller 65 is separated from the capstan shaft 15.

As described above, the first gear 42 is meshed with the limiter gear 34, the transmission gear 31 and the cam member 32 are released from being meshed with each other and the pinch roller 65 is separated from the capstan shaft 15, whereby the cassette tape recorder is set to the REV mode, i.e. the CUE mode required when the magnetic tape is transported in the reverse direction (see FIG. 25). In the CUE mode, based on the relationship of each gear ratio, the reel gear 45 is rotated at a high speed, and there may be executed a so-called CUE operation which is the fast-forwarding operation in the reproduction state presented when the magnetic tape is transported in the reverse direction.

While the FR lever 24 is moved in the X1 direction and located at the first position in the CUE mode, since the retained-member 26 is restricted from being moved by the restricting portion 16c of the tape running lever 16 and thereby located at the acting position, the resilient contact portion 27b of the return spring 27 is displaced in the X1 direction as the spring engagement portion 24e is moved, whereby the FR lever 24 is spring-biased in the X2 direction (see FIG. 25). Accordingly, when the operation of the FR lever 24 is released, the FR lever 24 may be moved in the X2 direction and located at the center position under spring force of the return spring 27, thereby resulting in the cassette tape recorder being set to the REV mode again (see FIG. 9). Incidentally, the FR lever 24 is returned to the center position, whereby the pinch roller 65 is urged against the capstan shaft 15.

In the REV mode, when the operator moves the FR lever 24 in the X2 direction by operating the FR operation portion 9 in a manual fashion, the cassette tape recorder is set to the REVIEW mode (see FIG. 26).

When the FR lever 24 is moved in the X2 direction in the REV mode, the rotating lever 41 is rotated in the R2 direction and the second gear 43 is meshed with the limiter gear 34 (see FIG. 26). At the same time, since the slide contact acting portion 24f is moved as the FR lever 24 is moved, the drive power transmission lever 29 is rotated in the R1 direction, whereby the small diameter portion 31b of the transmission gear 31 and the gear portion 32a of the cam member 32 are released from being meshed with each other. In the state in which the second gear 43 is meshed with the limiter gear 34, on the basis of the relationship of the number of gear teeth from the gear portion 13a of the flywheel 13 to the limiter gear 34, the rotating direction of the limiter gear 34 is changed, the oscillating lever 38 is rotated in the R1 direction, whereby the follower gear 40 and the reel holder gear 45 are released from being meshed with each other and the follower gear 39 and the reel holder gear 44 are meshed with each other.

As the FR lever 24 is moved in the X2 direction, the acted member 64b of the supporting member 64 is brought in slidable contact with the acting edge 24g to permit the supporting member 64 to be rotated in the R1 direction, whereby the pinch roller 65 is separated from the capstan shaft 15.

As described above, the second gear 43 is meshed with the limiter gear 34, the transmission gear 31 and the cam member 32 are released from being meshed with each other, the follower gear 39 and the reel holder gear 44 are meshed with each other and the pinch roller 65 is separated from the capstan shaft 15, whereby the cassette tape recorder may be set to the REV mode, i.e. the REVIEW mode obtained when the magnetic tape is transported in the reverse direction (see FIG. 26).

As described above, the cassette tape recorder 1 according to the present invention is set to the CUE mode regardless of the A NOR mode and the REV mode when the FR lever 24 is moved in the X1 direction so that the magnetic tape is transported at a high speed in the same direction as the direction in which the magnetic tape is transported in the NOR mode or the REV mode. When the FR lever 24 is moved in the X2 direction, regardless of the NOR mode or the REV mode, the cassette tape recorder is set to the REVIEW mode in which the tape is transported at a high speed in the direction opposite to the direction in which the magnetic tape is transported in the NOR mode or the REV mode.

Therefore, when the operator intends to fast-forward the magnetic tape, the operator should constantly move the FR lever 24 in the X1 direction. When the operator intends to rewind the magnetic tape, the operator should constantly move the FR lever 24 in the X2 direction. Thus, the operator need not consider and confirm the current running mode of the magnetic tape each time the operator fast-forwards or rewinds the magnetic tape. Therefore, the cassette tape recorder can become more convenient, and the operator can be prevented from the operation mistake.

The manner in which the cassette tape recorder is set to the FF mode and the REW mode will be described next with reference to FIGS. 27 to 29.

As described above, in the STOP mode, the FR lever 24 is located at the center position, accordingly, the rotating lever 41 is located at approximately the center in the rotating direction so that neither of the first gear 42 nor the second gear 43 may be meshed with the limiter gear 34 (see FIG. 22). In the STOP mode, the spring engagement portion 26b of the retained member 26 is located close to the spring engagement portion 24e of the FR lever 24 located at the center position in the Y direction, whereby the resilient contact portions 27b, 27c of the return spring 27 sandwich the spring engagement portion 24e and the spring engagement portion 26b under the condition that the resilient contact portions are intersected with each other (see FIG. 22). Further, in the STOP mode, the engagement protruded portion 21b of the switch lever 21 is engaged with the stop engagement edge 25a of the cam hole 25 of the FR lever 24 (see FIG. 22).

Figure 27:
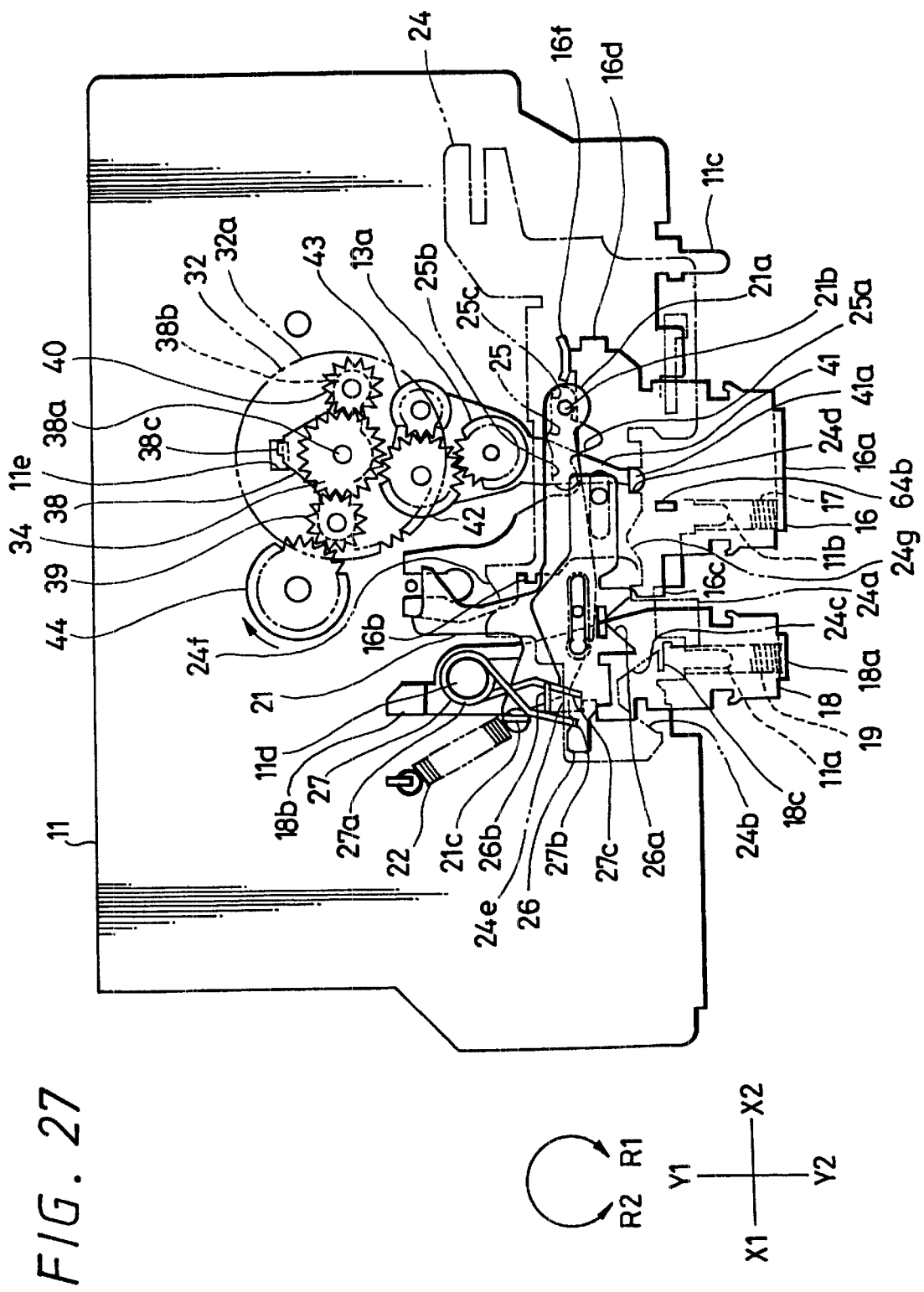
FIG. 27 is a schematic enlarged rear view showing the state in which the cassette tape recorder is set to the FF mode under the condition that a head switching lever is located at the first restricting position.

Under the state in which the head switching lever 58 is located at the first restricting position in the STOP mode as shown in FIG. 27, when the operator moves the FR lever 24 in the X1 direction, the cassette tape recorder is set to the FF mode.

When the FR lever 24 is moved in the X1 direction, the switch lever 21 is rotated in the R2 direction against the spring force of the lock spring 22, thereby resulting in the engagement protruded portion 21b being engaged with the fast-forwarding engagement edge 25c. Accordingly, the switch operation portion 21c operates the drive switch, not shown, permitting the drive motor 12 to be rotated.

At the same time, when the FR lever 24 is moved in the X1 direction, the rotating lever 41 is rotated in the R1 direction to permit the first gear 42 to be meshed with the limiter gear 34, the limiter gear 34 is rotated in the R1 direction in response to the rotating direction of the drive motor 12, the oscillaing gear 38 is rotated in the R1 direction and the follower gear 39 and the reel holder gear 44 are meshed with each other, thereby resulting in the reel holder gear 44 being rotated in the R1 direction.

As described above, the drive motor 12 is rotated and the first gear 42 is meshed with the limiter gear 34, whereby the cassette tape recorder is set to the FF mode presented when the magnetic tape is transported in the positive direction (see FIG. 27). In the FF mode, on the basis of the relationship of each gear ratio, the reel holder gear 44 is rotated at a high speed, and hence the magnetic tape can be fast-forwarded.

In the STOP mode, since the tape running lever 16 is not moved in the Y1 direction, the movement of the supported member 26 in the X1–X2 direction is not restricted. As a result, when the FR lever 24 is moved in the X1 direction, under the condition that the resilient contact portions 27b, 27c of the return spring 27 are intersected with each other, the resilient contact portions sandwich the spring engagement portion 24e and the spring engagement portion 26b so that the retained member 26 is moved in the X1 direction and reaches to the non-acting position together with the FR lever 24 in such a manner that the return spring 27 may be rotated around the supporting shaft 11d of the mechanical chassis 11 (see FIG. 27). Accordingly, the spring force of the return spring 27 does not act on the FR lever 24.

When the operator moves the stop lever 18 in the Y1 direction in the FF mode, the slide movement edge 24c of the FR lever 24 is pressed by the pressure member 18*c*. When the slide movement edge 24*c* is pressed by the pressure member 18*c*, the FR lever 24, which was located at the first position, is moved in the X2 direction and reaches to the center position. The rotating lever 41 is rotated in the R2 direction to permit the first gear 42 and the limiter gear 34 to be released from being meshed with each other. Concurrently therewith, the switch lever 21 is rotated in the R1 direction under spring force of the lock spring 22 to permit the engagement protruded portion 21*b* to be engaged with the stop engagement edge 25*a* of the cam hole 25. Since the switch operation portion 21*c* is released from operating the drive switch, not shown, the rotation of the drive motor 12 is stopped. Accordingly, the cassette tape recorder is again set to the STOP mode as shown in FIG. 22.

Incidentally, since the spring engagement portion 24*e* and the spring engagement portion 26*b* of the FR lever 24 and the retained member 26 are sandwiched by the return spring 27, the retained member 26 is moved in the X2 direction as the FR lever 24 is moved in the X2 direction.

Figure 28:
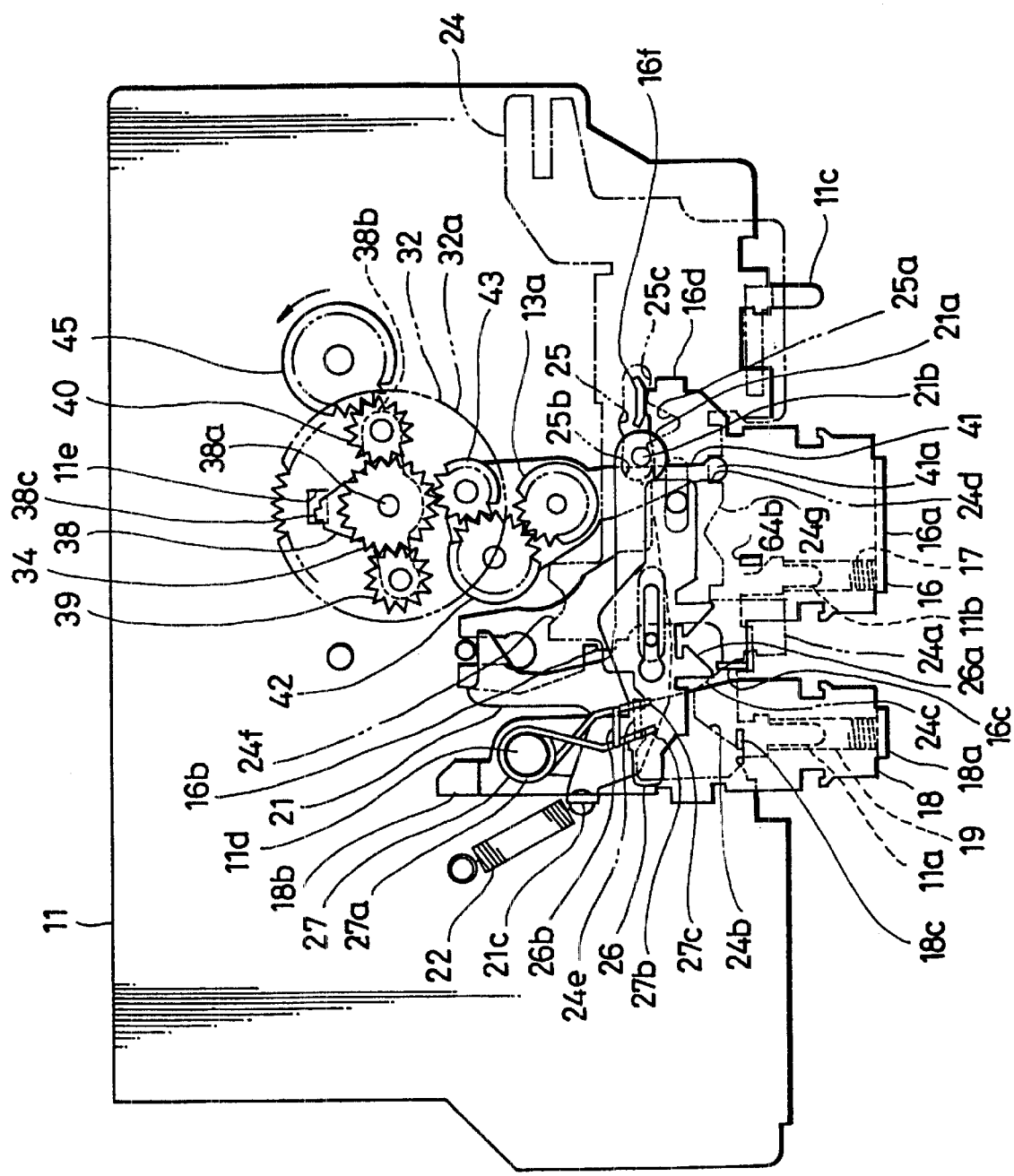
FIG. 28 is a schematic enlarged rear view showing the state in which the cassette tape recorder is set to the REW mode under the condition that the head switching lever is located at the first restricting position.

Under the condition in which the head switching lever 58 is located at the first restricting position in the STOP mode, when the FR lever 24 is moved in the X2 direction, the cassette tape recorder is set to the REW mode as shown in FIG. 28.

When the FR lever 24 is moved in the X2 direction, the switch lever 21 is rotated in the R2 direction against the spring force of the lock spring 22, whereby the engagement protruded portion 21*b* is engaged with the rewind engagement edge 25*b*. Therefore, the switch operation portion 21*c* operates the drive switch, not shown, to allow the drive motor 12 to rotate.

At the same time, the FR lever 24 is moved in the X2 direction, whereby the rotating lever 41 is rotated in the R2 direction and the second gear 43 is meshed with the limiter gear 34. The limiter gear 34 is rotated in the R2 direction in response to the rotating direction of the drive motor 12 to permit the oscillating lever 38 to be rotated in the R2 direction so that the follower gear 40 and the reel holder gear 45 are meshed with each other, thereby resulting in the reel holder gear 45 being rotated in the R2 direction.

As described above, the drive motor 12 is rotated and the second gear 43 is meshed with the limiter gear 34, whereby the cassette tape recorder is set to the REW mode obtained when the magnetic tape is transported in the positive direction as shown in FIG. 28. In the REW mode, on the basis of the relationship of each gear ratio, the reel holder gear 45 is rotated at a high speed, thereby rewinding the magnetic tape.

Since the tape running lever 16 is not operated in the Y1 direction in the STOP mode, the retained member 26 is not restricted from moving in the X1–X2 direction. As a consequence, the retained member 26 is moved in the X2 direction and thereby reaches to the non-acting position together with the FR lever 24 as shown in FIG. 8. Accordingly, the spring force of the return spring 27 does not act on the FR lever 24.

When the operator moves the stop lever 18 in the Y1 direction in the REW mode, the slide movement edge 24*b* of the FR lever 24 is pressed by the pressure member 18*c*, the FR lever 24, which had been located at the second position, is moved in the X1 direction and reaches to the center position. The rotating lever 41 is rotated in the R1 direction to permit the second gear 43 and the limiter gear 34 to be released from being meshed with each other. Concurrently therewith, the switch lever 21 is rotated in the R1 direction under spring force of the lock spring 22 to permit the engagement protruded portion 21*b* to be engaged with the stop engagement edge 25*a* of the cam hole 25. Since the switch operation portion 21*c* is released from operating the drive switch, not shown, the rotation of the drive motor 12 is stopped. Accordingly, the cassette tape recorder is again set to the STOP mode as shown in FIG. 22.

Since the spring engagement portion. 24*e* and the spring engagement portion 26*b* of the FR lever 24 and the retained member 26 are sandwiched by the return spring 27, the retained member 26 is moved in the X1 direction as the FR lever 24 is moved in the X1 direction.

As described above, in the cassette tape recorder. 1 according to the present invention, since the movement of the retained member 26 in the X1–X2 direction is restricted by the restricting portion 16*c* formed on the tape running lever 16, the arrangement of the cassette tape recorder can be simplified and the assemblies thereof can be prevented from being increased, which may contribute to the reduction of manufacturing cost.

Figure 29:
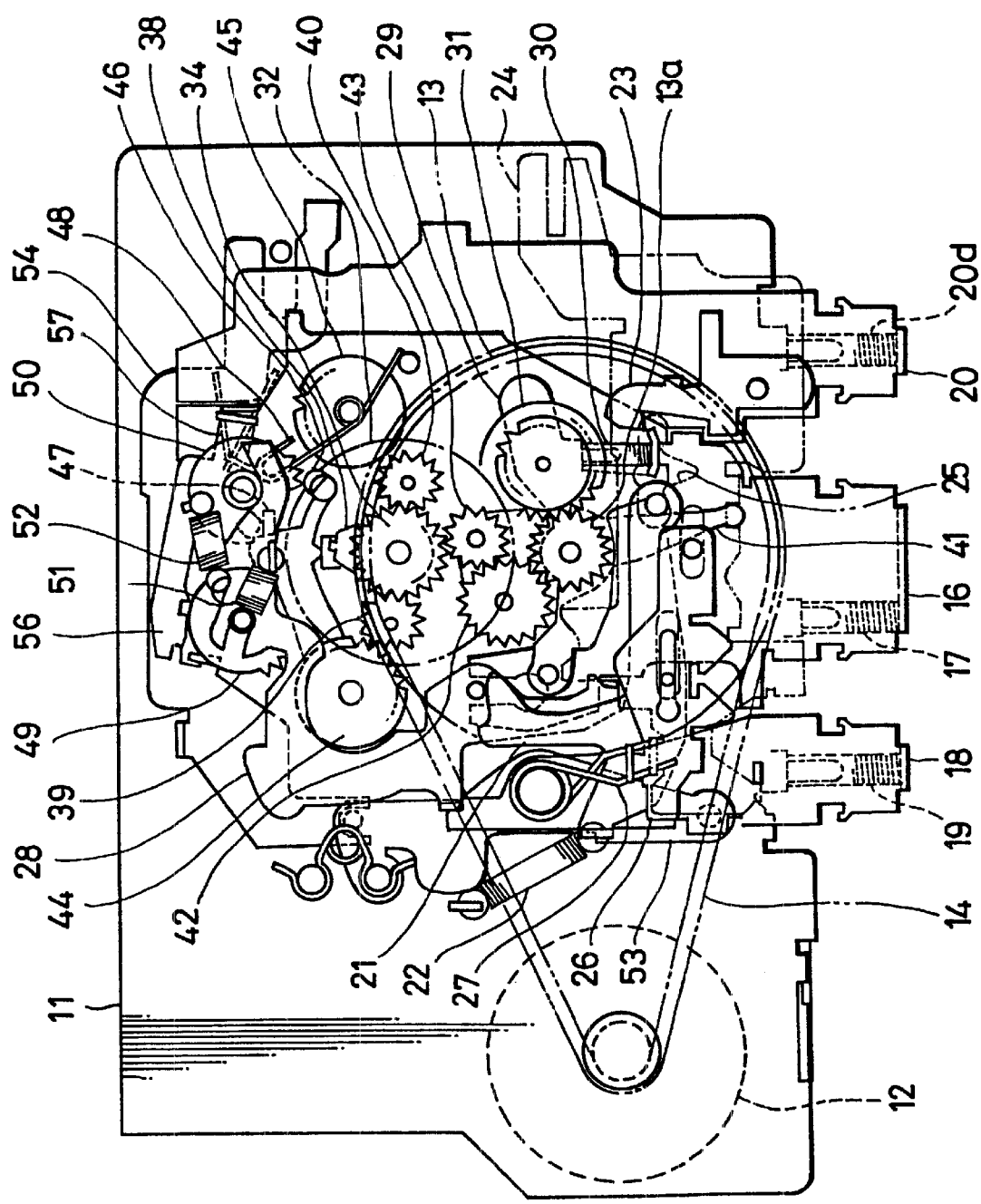
FIG. 29 is a schematic enlarged rear view showing the state in which the cassette tape recorder is set to the REW mode under the condition that the head switching lever is located at the second restricting position.

The manner in which the FR lever 24 is operated as shown in FIG. 29 under the condition that the head switching lever 58 is located at the second restricting position in the STOP mode will be described next in brief. FIG. 29 shows the manner in which the magnetic tape is rewound.

When the FR lever 24 is moved in the X2 direction, the switch lever 21 is rotated in the R2 direction, permitting the engagement protruded portion 21*b* to be engaged with the rewind engagement edge 25*b*. Accordingly, the switch operation portion 21*c* operates the drive switch, not shown, to thereby rotate the drive motor 12.

At the same time, the FR lever 24 is moved in the X2 direction, whereby the rotating lever 41 is rotated in the R2 direction and the second gear 43 is meshed with the limiter gear 34. The limiter gear 34 is rotated in the R1 direction in response to the rotating direction of the drive motor 12, whereby the oscillating lever 38 is rotated in the R1 direction and the follower gear 39 is meshed with the reel holder gear 44, to thereby permit the reel holder gear 44 to rotate in the R1 direction.

As described above, the drive motor 12 is rotated and the second gear 43 is meshed with the limiter gear 34, whereby the cassette tape recorder is set to the REW mode obtained under the condition that the head switching lever 58 is located at the second restricting position. In the REW mode, on the basis of the relationship of each gear ratio, the reel holder gear 44 can be rotated at a high speed thereby to rewind the tape.

In the STOP mode, since the tape running lever 16 is not operated in the Y1 direction, the retained member 26 is not restricted from being moved in the X1–X2 direction. Therefore, when the FR lever 24 is moved in the X2 direction, as shown in FIG. 29, the retained member 26 is moved in the X2 direction and reaches to the non-acting position together with the FR lever 24. Accordingly, the spring force of the return spring 27 does not act on the FR lever 24.

When the operator moves the stop lever 18 in the Y1 direction in the REW mode, the slide movement edge 24*b* of the FR lever 24 is pressed by the pressure member 18*c*, whereby the FR lever 24, which had been located at the second position, is moved in the X1 direction together with the retained member 26 and then returned to the original state. The rotating lever 41 is rotated in the R1 direction and returned to the original state. Concurrently therewith, the switch lever 21 is rotated in the R1 direction and the engagement protruded portion 21*b* is engaged with the stop engagement edge 25a of the cam hole 25, whereby the rotation of the drive motor 12 is stopped. Accordingly, as shown in FIG. 22, the cassette tape recorder is again set to the STOP mode.

When the FR lever 24 is operated in the X1 direction under the condition that the head switching lever 58 is located at the second restricting position in the STOP mode, the switch lever 21 is rotated in the R2 direction, permitting the drive motor 12 to rotate. At the same time, when the FR lever 24 is moved in the X1 direction, the rotating lever 41 is rotated in the R1 direction, whereby the first gear 42 is meshed with the limiter gear 34. The limiter gear 34 is rotated in the R2 direction and the oscillating lever 38 is rotated in the R2 direction, whereby the follower gear 40 and the reel holder gear 45 are meshed with each other, thereby resulting in the reel holder gear 45 being rotated in the R2 direction.

As described above, the drive motor 12 is rotated and the first gear 42 is meshed with the limiter gear 34, whereby the cassette tape recorder is set to the FF mode obtained under the condition that the head switching lever 58 is located at the second restricting position. In the FF mode, on the basis of the relationship of each gear ratio, the reel holder gear 45 is rotated at a high speed, whereby the magnetic tape may be fast-forwarded.

When the FR lever 24 is moved in the X1 direction, the retained member 26 is moved in the X1 direction together with the FR lever 24 and reaches to the non-acting position. Accordingly, the spring force of the return spring 27 does not act on the FR lever 24.

When the stop lever 18 is operated in the Y1 direction in the FF mode, the slide movement edge 24c of the FR lever 24 is pressed by the pressure member 18c, whereby the FR lever 24, which had been located at the first position, is moved in the X2 direction together with the retained member 26 and returned to the original state. The rotating lever 41 is rotated in the R2 direction and returned to the original state. Concurrently therewith, the switch lever 21 is rotated in the R1 direction and the engagement protruded portion 21b is engaged with the stop engagement edge 25a of the cam hole 25, thereby resulting in the rotation of the drive motor 12 being stopped. Therefore, the cassette tape recorder is again set to the STOP mode as shown in FIG. 22. As described above, in the cassette tape recorder 1 according to the present invention, when the setting of the FF mode or the REW mode and the STOP mode is switched, the spring force of the return spring 27 does not act on the FR lever 24. Therefore, the operation of the FR operation portion 9 required when the setting of the FF mode or the REW mode and the STOP mode is switched can be executed by a considerably small force, thereby making it possible to improve an operability of the cassette tape recorder.

Since the FR lever 24 and the retained member 26 are moved integrally by forming the spring engagement portions 24e, 26b, which are each engaged with the return spring 27, on the FR lever 24 and the retained member 26, the cassette tape recorder can be simplified in arrangement and the assemblies thereof can be prevented from being increased, which can contribute to the reduction of manufacturing cost.

Since the STOP mode is set from the FF mode or the REW mode and the pressure member 18c formed on the stop lever 18 and the slide movement edge 24b, 24c formed on the FR lever 24 are slidably operated with each other, the cassette tape recorder can be simplified in arrangement and the assemblies thereof can be prevented from being increased, which can contribute to much more reduction of the manufacturing cost.

As will be clear from the description made so far, the cassette tape recorder according to the embodiment of the present invention may comprise a pair of reel holder gears respectively provided in reel shafts which are respectively engaged with a pair of reels around which a tape is wound, an operation portion including a switching operation portion for switching at least a tape fast-forwarding operation or a tape rewinding operation when it is moved and a running mechanism for transporting the tape in the positive direction and transporting the tape in the reverse direction by selectively driving the pair of reel holder gears and executing the fast-forwarding operation and the rewinding operation based on a moving operation direction of the switching operation portion, wherein as the tape is transported in the positive direction, when the switching operation portion is moved in pne direction, then the tape is transported at a high speed in the positive direction and thereby the tape is fast-forwarded and, when the switching operation portion is moved in other direction opposite to the one direction, the tape is transported at a high speed in the reverse direction and thereby the tape is rewound, when the switching operation portion is moved in one direction in the reverse running mode, the tape is transported at a high speed in the reverse direction and thereby the tape is fast-forwarded and when the switching operation portion is moved in the other direction, the tape is transported in the positive direction at a high speed and thereby the tape is rewound.

Accordingly, when the operator intends to fast-forward the tape, the operator should constantly move the switching operation portion in one direction. When the operator intends to rewind the tape, the operator should constantly move the switching operation portion in the direction opposite to the one direction. Therefore, the operator need not consider and confirm the current mode each time. Thus, the cassette tape recorder can be made more convenient, a and the operator can be protected from operation mistake.

Incidentally, while the concrete shapes and structures of the respective portions shown in the above-mentioned embodiment illustrate only examples of concrete shapes and structures required when the embodiment of the present invention is carried out, it will be appreciated that the technical scope of the present invention should not be limitedly interpreted by these concrete shapes and structures.

What is claimed is:

1. A tape recording and/or reproducing apparatus comprising:

a pair of reel holder gears respectively provided with reel shafts which are respectively engaged with a pair of reels around which a tape is wound;

an operation portion including a switching operation portion for switching at least a tape fast-forwarding operation and a tape rewinding operation when moved; and a running mechanism for transporting the tape in the positive direction and in the reverse direction by selectively driving said pair of reel holder gears and executing said fast-forwarding operation and said rewinding operation based on a direction in which said switching operation portion is moved wherein when the tape is transported in a positive direction and said switching operation portion is moved in a first direction, then the tape is transported in the positive direction at a high speed, whereby the tape is fast-forwarded, and when said switching operation portion is moved in a second direction opposite to said first direction, then the tape is transported in the reverse direction at a high speed, whereby the tape is rewound, when said switching operation portion is moved in said first direction in a reverse running mode, then the tape is transported at a high speed in the reverse direction, whereby the tape is fast-forwarded, and when said switching operation portion is moved in said second direction, then said tape is transported in the positive direction at a high speed, whereby the tape is rewound.

2. The tape recording and/or reproducing apparatus as claimed in claim 1, wherein said running mechanism comprises a drive motor for rotation in the positive direction and in the reverse direction, an oscillating mechanism including a pair of follower gears which are meshed with one of said pair of reel holder gears in response to a rotation direction of said drive motor, and a selection drive mechanism including a rotating mechanism rotated in response to the operation of said switching operation portion, thereby changing the rotation direction of said one of said pair of reel holder gears.

3. The tape recording and/or reproducing apparatus as claimed in claim 2, wherein said rotating mechanism includes a rotating lever rotated in response to a direction in which said switching operation portion is moved and supporting a first gear and a second gear meshed with each other and rotated by a drive force of said drive motor transmitted thereto and said oscillating mechanism includes a limiter gear meshed with said pair of follower gears and which are also selectively meshed with one of said first gear and said second gear as said rotating lever is rotated and an oscillating lever rotated in the direction corresponding to a rotation direction of said limiter gear.

4. The tape recording and/or reproducing apparatus as claimed in claim 1, wherein said switching operation portion is moved between a first position and a second position relative to a center position and said apparatus further includes a return spring for returning said switching operation portion, when a signal is recorded on and/or reproduced from said tape, from said first position or said second position to said center position and a retained member for retaining said return spring at an acting position at which a spring force of said return spring acts on said switching operation portion when said switching operation portion is operated at said first position or said second position when a signal is recorded on and/or reproduced from a tape and retaining said return spring at a non-acting position at which the spring force of said return spring does not act on said switching operation portion when said switching operation portion is operated at said first position or said second position when a signal is not recorded on and/or not reproduced from a tape.

5. The recording and/or reproducing apparatus according to claim 4, further comprising return means for returning said switching operation portion to said center position when a signal is not recorded on and/or not reproduced from the tape.

6. The tape recording and/or reproducing apparatus as claimed in claim 4, wherein said switching operation portion and said retained member include spring engagement portions respectively engaged with said return spring and moving said switching operation portion and said retained member while being held in a constant relative position when said switching operation portion is operated when a signal is not recorded on and/or not reproduced from the tape and said retained member is held at a non-acting position when a signal is not recorded and/or not reproduced from the tape.

7. The tape recording and/or reproducing apparatus as claimed in claim 5, wherein said switching operation portion has a slide movement edge formed thereon, said return means includes a stop lever for stopping operation of said tape running mechanism and said stop lever has formed thereon a pressure member for pressing said slide movement edge to cause said switching operation portion to be returned from said first position or said second position to said center position when said stop lever is operated.

8. The tape recording and/or reproducing apparatus as claimed in claim 1, wherein said operation portion further includes a running direction switching lever for switching a running direction of the tape when moved and further comprising a restricting mechanism for restricting movement of said running direction switching lever when a signal is recorded on the tape.

9. The tape recording and/or reproducing apparatus as claimed in claim 8, wherein said restricting mechanism includes a movement restricting lever for restricting movement of said running direction switching lever when a signal is recorded on the tape and a restriction releasing member for temporarily releasing said running direction switching lever from being restricted by said movement restricting lever when the tape reaches its end.

10. The tape recording and/or reproducing apparatus as claimed in claim 9, wherein said running direction switching lever has a non-acting portion formed thereon and said restriction releasing member has formed thereon an acting portion for acting on said non-acting portion of said running direction switching lever to cause said running direction switching lever to execute a switching operation when said restriction releasing member temporarily releases said running direction switching lever from being restricted by said movement restricting lever.

11. A tape recording and/or reproducing apparatus comprising:

a pair of reel holder gears respectively provided with reel shafts respectively engaged with a pair of reels around which a tape is wound;

an operation portion including a switching operation portion for switching at least a positive direction tape running and a reverse direction tape running when moved and a recording operation portion for setting a recording state in which a signal is recorded on a tape;

a tape running mechanism including a running direction switching lever for transporting the tape in the positive direction and in the reverse direction by selectively driving said pair of reel holder gears and switching a running direction of the tape when said switching operation portion is operated; and a restricting mechanism for restricting movement of said running direction switching lever when said recording operation portion is operated to set the recording state.

12. The tape recording and/or reproducing apparatus as claimed in claim 11, wherein said restricting mechanism includes a movement restricting lever for restricting movement of said running direction switching lever when a signal is recorded on the tape and a restriction releasing member for temporarily releasing said running direction switching lever from being restricted by said movement restricting lever when a tape reaches its end.

13. The tape recording and/or reproducing apparatus as claimed in claim 11, wherein said running direction switching lever has an acted portion formed thereon and said restriction releasing member has formed thereon an acting portion for acting on said acted portion of said running direction switching lever to cause said running direction switching lever to be switched when said restriction releasing member temporarily releases said running direction switching lever from being restricted by said movement restricting lever.

14. The tape recording and/or reproducing apparatus according to claim 12, further comprising a mechanical chassis, a cam member rotatably supported on said mechanical chassis, and a swing lever having a slide contact portion for rotation in a direction corresponding to a rotation direction of one of said pair of reel holders, said swing lever operating said running direction switching lever when rotated to an operation position, and said cam member includes a protruded cam portion engaged with said slide contact portion of said swing lever to move said swing lever to the operation position when rotation of said one of said pair of reel holders is stopped and a slide contact cam portion for slidably contacting said slide contact portion of said swing lever to cause said swing lever to swing between a non-engagement position at which said slide contact portion cannot be engaged with said protruded cam portion and an engagement preparation position at which said slide contact portion can be engaged with said protruded cam portion when said swing lever is rotated in a predetermined direction.

15. The tape recording and/or reproducing apparatus according to claim 14, further comprising a spring-biasing member for spring-biasing said swing lever in a direction in which said slide contact portion approaches said slide contact cam portion of said cam member when a running mode of said tape is switched.

16. The tape recording and/or reproducing apparatus as claimed in claim 15, wherein said spring-biasing member is rotated as an other reel holder of said pair of reel holders is rotated.

17. The tape recording and/or reproducing apparatus as claimed in claim 14, wherein said protruded cam portion further includes a gear portion formed around an outer peripheral portion thereof, and further comprising a running stop lever for stopping running of the tape and a running reversing gear and a running stop gear are selectively meshed with said gear portion of said cam member in response to the rotating direction of said cam member when said swing lever is rotated to said operation position, in which when said running reversing gear and said gear portion of said cam member are meshed with each other, said running reversing gear operates said running direction switching lever to switch the running direction of the tape and when said running stop gear and said gear portion of said cam member are meshed with each other, said stop gear operates said running stop lever to stop the running of the tape.

18. The tape recording and/or reproducing apparatus according to claim 11, further comprising a first base and a second base for respective rotation around one rotation supporting point, a first magnetic head and a second magnetic head respectively disposed on said first base and said second base, a tape running lever for rotating said first base and said second base in a direction in which said first magnetic head or said second magnetic head approaches the tape and for causing the tape to be transported, and a head switching lever being moved between a first restricting position at which rotation of said first base is restricted and a second restricting position at which rotation of said second base is restricted, in which said first magnetic head or said second magnetic head is selectively brought in contact with the tape in response to a position of said head switching lever.

19. The tape recording and/or reproducing apparatus according to claim 18, further comprising an end detection mechanism for detecting an end of the tape, wherein a running direction of the tape is switched by the switching operation of said running direction switching lever in unison with the operation of said head switching lever and the running direction of the tape is switched by the switching operation of said running direction switching lever when the end of the tape is detected by said end detection mechanism.

20. A tape running drive apparatus comprising;
a pair of reel holder gears respectively provided with reel shafts respectively engaged with a pair of reels around which a tape is wound;
an operation portion including a movable switching operation portion for switching at least a fast-forwarding operation and a rewinding operation when said switching operation portion is moved; and
a running mechanism for transporting the tape in a positive direction and in a reverse direction by selectively driving said pair of reel holder gears and executing said fast-forwarding operation and said rewinding operation based on a movement direction of said switching operation portion, wherein when the tape is transported in the positive direction and said switching operation portion is moved in a first direction, then said tape is transported at a high speed in the positive direction to thereby fast-forward said tape, and when said switching operation portion is moved in a second direction opposite to said first direction, the tape is transported at a high speed in the reverse direction to thereby rewind said tape, wherein
upon a reverse running mode, when said switching operation portion is moved in said one direction, then the tape is transported at a high speed in the reverse direction to thereby fast-forward the tape and when said switching operation portion is moved in said second direction, said tape is transported at a high speed in the positive direction to thereby rewind said tape.

21. The tape running drive apparatus as claimed in claim 20, wherein said running mechanism includes a selection drive mechanism comprising a drive motor for rotation in the positive direction and in the reverse direction, an oscillating mechanism including a pair of follower gears meshed with one of said pair of reel holder gears in response to a rotation direction of said drive motor and a rotation mechanism rotated in response to operation of said switching operation portion to thereby change the rotating direction of said one of said pair of reel holder gears.

22. The tape running drive apparatus as claimed in claim 21, wherein said rotation mechanism includes a rotation lever rotated in a direction corresponding to the moving operation direction of said switching operation portion and supporting a first gear and a second gear under a condition that said first gear and said second gear are meshed with each other and rotated in response to a drive force transmitted thereto from said drive motor, and said oscillating mechanism includes a limiter gear meshed with said pair of follower gears and which is selectively meshed with said first gear or said second gear in accordance with a rotation of said rotation lever, and an oscillating lever rotated in a direction corresponding to the rotating direction of said limiter gear.

23. The tape running drive apparatus according to claim 20, further comprising a mechanical chassis, a cam member rotatably supported by said mechanical chassis, and a swing lever having a slide contact portion for rotation in a direction corresponding to the rotating direction of one of said pair of reel holders and for operating said running direction switching lever when said swing lever is rotated to an operation position, wherein said slide contact portion of said swing lever to thereby move said swing lever to the operation position when the rotation of said one of said pair of reel holders is stopped and a slide contact cam portion slidably contacted with said side contact portion of said swing lever when said swing lever is rotated in a predetermined direction to thereby swing said swing lever between a non-engagement position at which said slide contact portion cannot be engaged with said protruded cam portion and an engagement preparation position at which said slide contact portion can be engaged with said protruded cam portion.

24. The tape running drive apparatus according to claim 23, further comprising a spring-biasing member for spring-biasing said swing lever in a direction in which said slide contact portion approaches said slide contact cam portion of said cam member when a running mode of the tape is switched.

25. The tape running drive apparatus as claimed in claim 24, wherein said spring-biasing member is rotated as an other reel holder of said pair of reel holders is rotated.

26. The tape running drive apparatus as claimed in claim 23, wherein said cam member further includes a gear portion formed around an outer peripheral portion thereof, and further comprising:

a running stop lever for stopping running of the tape, a running reversing gear, and a running stop gear selectively meshed with said gear portion of said cam member in response to the rotating direction of said cam member when said swing lever is rotated to said operation position and wherein when said running reversing gear and said cam member are meshed with each other, said running reversing gear and said cam member are meshed with each other, said running reversing gear operates said running direction switching lever to thereby switch the running direction of the tape and when said running stop gear and said gear portion of said cam member are meshed with each other, said stop gear operates said running stop lever to thereby stop the running of the tape.

* * * * *